United States Patent
Widén

(10) Patent No.: US 11,542,724 B1
(45) Date of Patent: Jan. 3, 2023

(54) KEY BLANK, A KEY, AND A CYLINDER LOCK AND KEY COMBINATION

(71) Applicant: WINLOC AG, Zug (CH)

(72) Inventor: Bo Widén, Torshälla (SE)

(73) Assignee: WINLOC AG, Zug (CH)

( * ) Notice: Subject to any disclaimer, the term of this patent is extended or adjusted under 35 U.S.C. 154(b) by 0 days.

(21) Appl. No.: 17/892,938

(22) Filed: Aug. 22, 2022

(51) Int. Cl.
  *E05B 19/00* (2006.01)
  *E05B 27/10* (2006.01)
  *E05B 27/02* (2006.01)

(52) U.S. Cl.
  CPC ........ *E05B 19/0058* (2013.01); *E05B 19/007* (2013.01); *E05B 19/0035* (2013.01); *E05B 19/0052* (2013.01); *E05B 27/02* (2013.01); *E05B 27/10* (2021.08)

(58) Field of Classification Search
  CPC ............. E05B 19/0029; E05B 19/0035; E05B 19/0041; E05B 19/0052; E05B 19/0058; E05B 19/007; E05B 27/0007; E05B 27/02; E05B 27/08; E05B 27/083; E05B 27/10
  See application file for complete search history.

(56) References Cited

U.S. PATENT DOCUMENTS

| | | | |
|---|---|---|---|
| 1,438,336 A * | 12/1922 | Schroeder | E05B 19/0017 70/393 |
| 2,318,887 A | 5/1943 | Ramsell et al. | |
| 2,803,959 A | 8/1957 | Schlage | |
| 2,814,941 A | 12/1957 | Best | |
| 4,099,398 A | 7/1978 | Lipschutz | |
| 4,114,411 A | 9/1978 | Schlage | |
| 4,282,731 A | 8/1981 | Taksony | |
| 4,294,093 A | 10/1981 | Best et al. | |
| 4,320,638 A * | 3/1982 | Dunphy | E05B 19/0017 70/358 |
| 4,386,510 A | 6/1983 | Best et al. | |
| 4,416,128 A * | 11/1983 | Steinbrink | E05B 19/0029 70/409 |
| 4,787,225 A | 11/1988 | Haüser et al. | |
| 4,823,575 A | 4/1989 | Florian et al. | |
| 5,050,412 A | 9/1991 | Errani | |

(Continued)

FOREIGN PATENT DOCUMENTS

| | | |
|---|---|---|
| AT | 004293 U1 | 5/2001 |
| CA | 2179675 A1 | 12/1996 |

(Continued)

*Primary Examiner* — Christopher J Boswell
(74) *Attorney, Agent, or Firm* — Birch, Stewart, Kolasch & Birch, LLP

(57) ABSTRACT

A substantially flat key blade extends from a grip portion and has a connecting portion, a major longitudinal bitting portion and a free tip portion. The substantially flat key blade has a cross-sectional profile which, in the major longitudinal bitting portion, is confined within a rectangle having a height, measured in a vertical direction, being at least 2.5 times larger than a width thereof, and extends upwards in the vertical direction from a lower edge surface to an upper edge surface along a vertical mid-plane through the rectangle. A single upper part of the key blade has a relatively small lateral width being no more than 33% of the lower relatively wide part of the key blade and extends obliquely upwards at a relatively small inclinational angle in the interval 3° to 12° relative to a vertical plane.

21 Claims, 12 Drawing Sheets

(56) References Cited

U.S. PATENT DOCUMENTS

| | | | |
|---|---|---|---|
| 5,067,335 A * | 11/1991 | Widen | E05B 27/0082 70/495 |
| 5,136,869 A | 8/1992 | Best | |
| 5,176,015 A | 1/1993 | Sussina | |
| 5,185,917 A | 2/1993 | Kremen | |
| 5,272,895 A | 12/1993 | Best | |
| 5,493,884 A | 2/1996 | Hinz et al. | |
| 5,507,163 A | 4/1996 | Juang | |
| 5,617,750 A | 4/1997 | Preddey | |
| RE35,518 E * | 5/1997 | Sussina | E05B 27/0053 70/369 |
| 5,715,717 A * | 2/1998 | Widen | E05B 19/0017 70/420 |
| 6,014,877 A | 1/2000 | Shen | |
| 6,503,032 B1 | 1/2003 | Simonsson | |
| 7,484,392 B2 * | 2/2009 | Katagiri | E05B 19/046 70/456 R |
| 7,647,798 B1 | 1/2010 | Jones et al. | |
| 7,665,337 B1 * | 2/2010 | Widen | E05B 19/0029 70/495 |
| 8,205,473 B2 * | 6/2012 | Widen | E05B 19/0029 70/405 |
| 8,230,708 B2 * | 7/2012 | Widen | E05B 27/0042 70/495 |
| 8,312,749 B2 | 11/2012 | Tong | |
| 8,800,333 B2 * | 8/2014 | Rao | E05B 19/0041 70/495 |
| 9,598,880 B2 | 3/2017 | Walls et al. | |
| 10,273,717 B2 * | 4/2019 | Clifford | E05B 27/005 |
| 11,162,278 B2 * | 11/2021 | Holda | E05B 19/007 |
| 2004/0016273 A1 | 1/2004 | Keller | |
| 2007/0017264 A1 | 1/2007 | Seliber | |
| 2008/0016928 A1 | 1/2008 | Yang et al. | |
| 2008/0163657 A1 | 7/2008 | Dickhans et al. | |
| 2008/0276675 A1 | 11/2008 | Herdman | |
| 2009/0217720 A1 | 9/2009 | Herdman | |
| 2010/0005842 A1 | 1/2010 | Herdman | |
| 2011/0289989 A1 | 12/2011 | Reine et al. | |
| 2011/0289990 A1 | 12/2011 | Piotrowski et al. | |
| 2015/0240525 A1 | 8/2015 | Walls et al. | |

FOREIGN PATENT DOCUMENTS

| | | |
|---|---|---|
| CH | 717636 B1 | 1/2022 |
| CN | 103737248 A | 4/2014 |
| CZ | 2015-456 A3 | 8/2016 |
| CZ | 31363 U1 | 1/2018 |
| DE | 2516340 A1 | 11/1975 |
| DE | 7729544 U1 | 1/1978 |
| DE | 3021331 C2 | 3/1981 |
| DE | 3245856 A1 | 6/1984 |
| DE | 4127915 A1 | 3/1993 |
| DE | 4237341 A1 | 5/1994 |
| DE | 4314724 A1 | 11/1994 |
| DE | 4316439 A1 | 11/1994 |
| DE | 29502687 U1 | 4/1995 |
| DE | 29506683 U1 | 6/1995 |
| DE | 29510153 U1 | 10/1995 |
| DE | 29703063 U1 | 6/1997 |
| DE | 19712009 A1 | 10/1997 |
| DE | 29720129 U1 | 4/1998 |
| DE | 19706822 A1 | 8/1998 |
| DE | 19741118 A1 | 3/1999 |
| DE | 19821850 C1 | 9/1999 |
| DE | 10050386 A1 | 4/2002 |
| DE | 10333211 A1 | 3/2005 |
| DE | 102004026064 B3 | 6/2005 |
| EP | 0161654 A2 | 11/1985 |
| EP | 0386504 A1 | 9/1990 |
| EP | 0574752 A1 | 12/1993 |
| EP | 0637663 A1 | 2/1995 |
| EP | 0780530 A1 | 6/1997 |
| EP | 0846819 A1 | 6/1998 |
| EP | 0928867 A2 | 7/1999 |
| EP | 1600585 A2 | 11/2005 |
| EP | 2333203 A2 | 6/2011 |
| EP | 2390030 A2 | 11/2011 |
| EP | 3219882 B1 | 7/2018 |
| EP | 3366870 A1 | 8/2018 |
| EP | 3366871 A1 | 8/2018 |
| EP | 3418476 A1 | 12/2018 |
| EP | 3542950 A1 | 9/2019 |
| FR | 1443313 A | 6/1966 |
| FR | 2388966 A1 | 11/1978 |
| GB | 190122782 A | 1/1902 |
| GB | 2356016 A | 5/2001 |
| SE | 467265 B | 6/1992 |
| WO | WO 93/10323 A1 | 5/1993 |
| WO | WO 00/15374 A1 | 3/2000 |
| WO | WO 01/36768 A1 | 5/2001 |
| WO | WO 03/004806 A1 | 1/2003 |
| WO | WO 2013/121114 A1 | 8/2013 |
| WO | WO 2016/098133 A1 | 6/2016 |
| WO | WO 2020/053461 A1 | 3/2020 |

\* cited by examiner

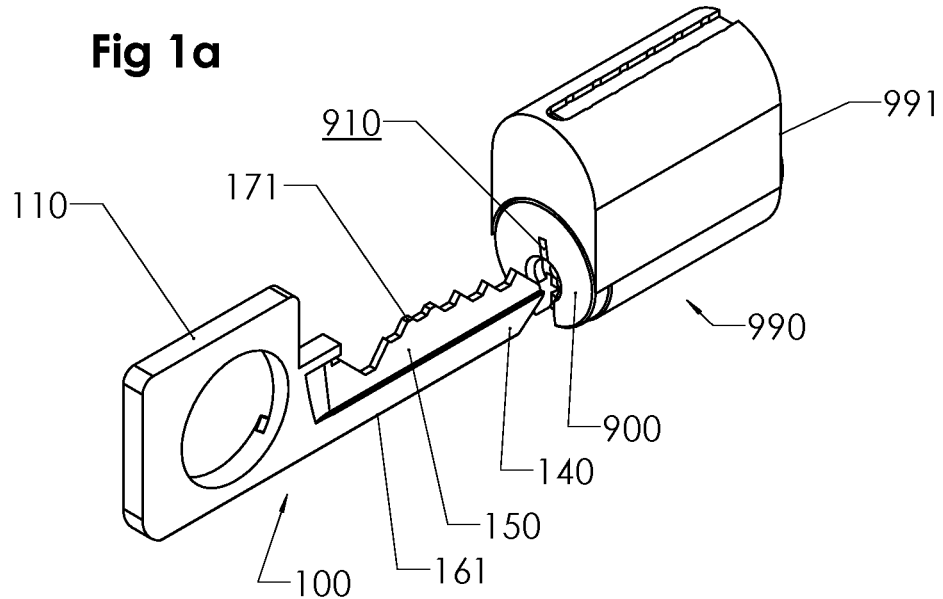
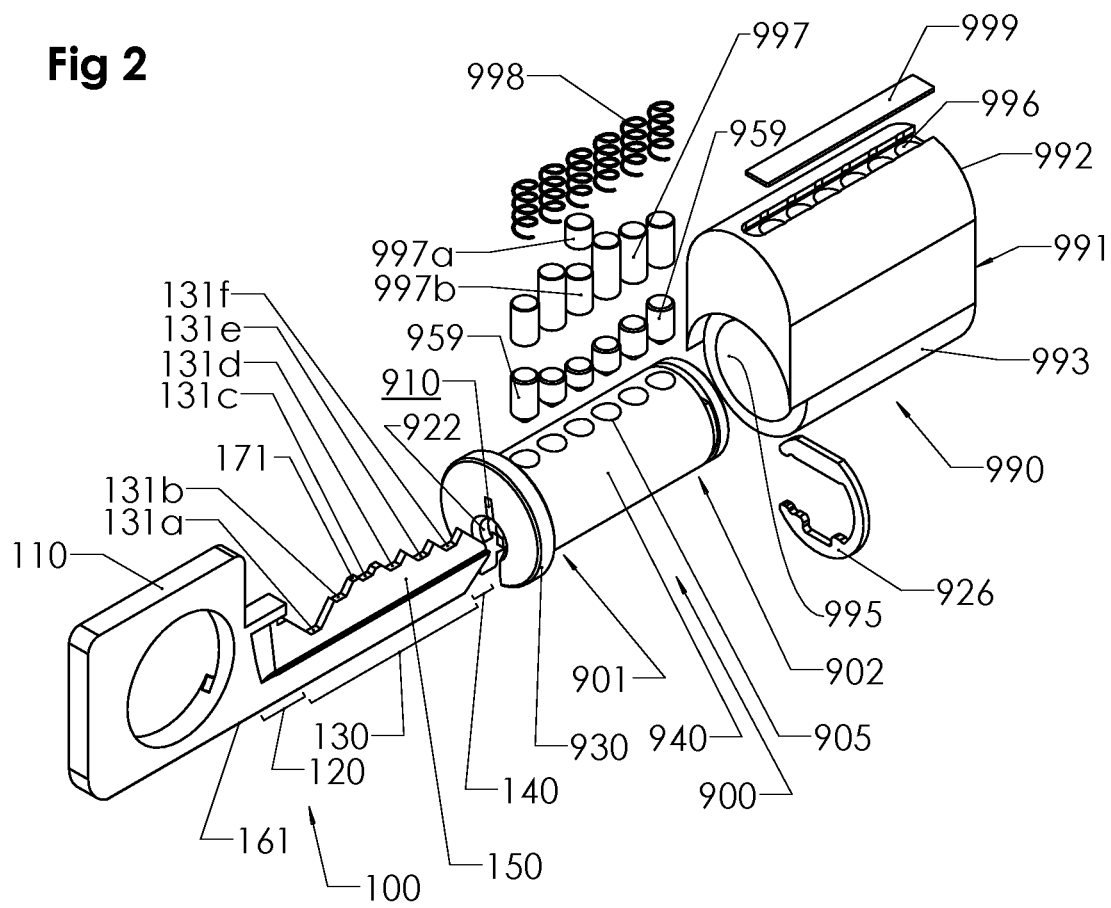

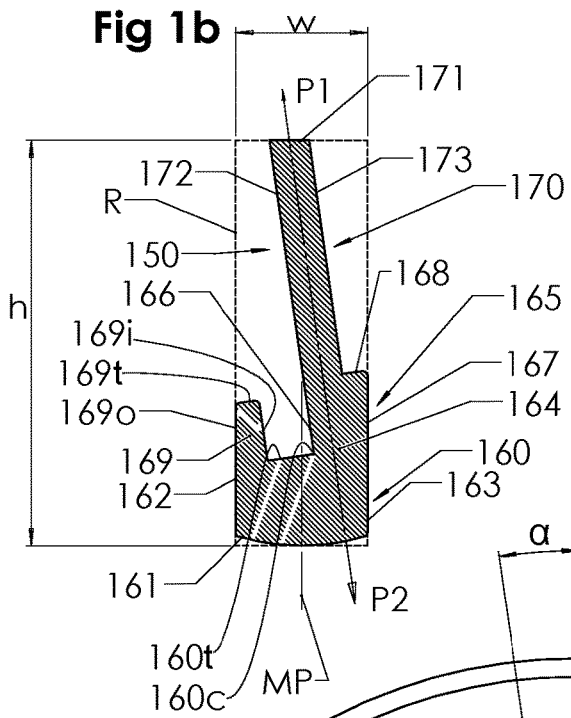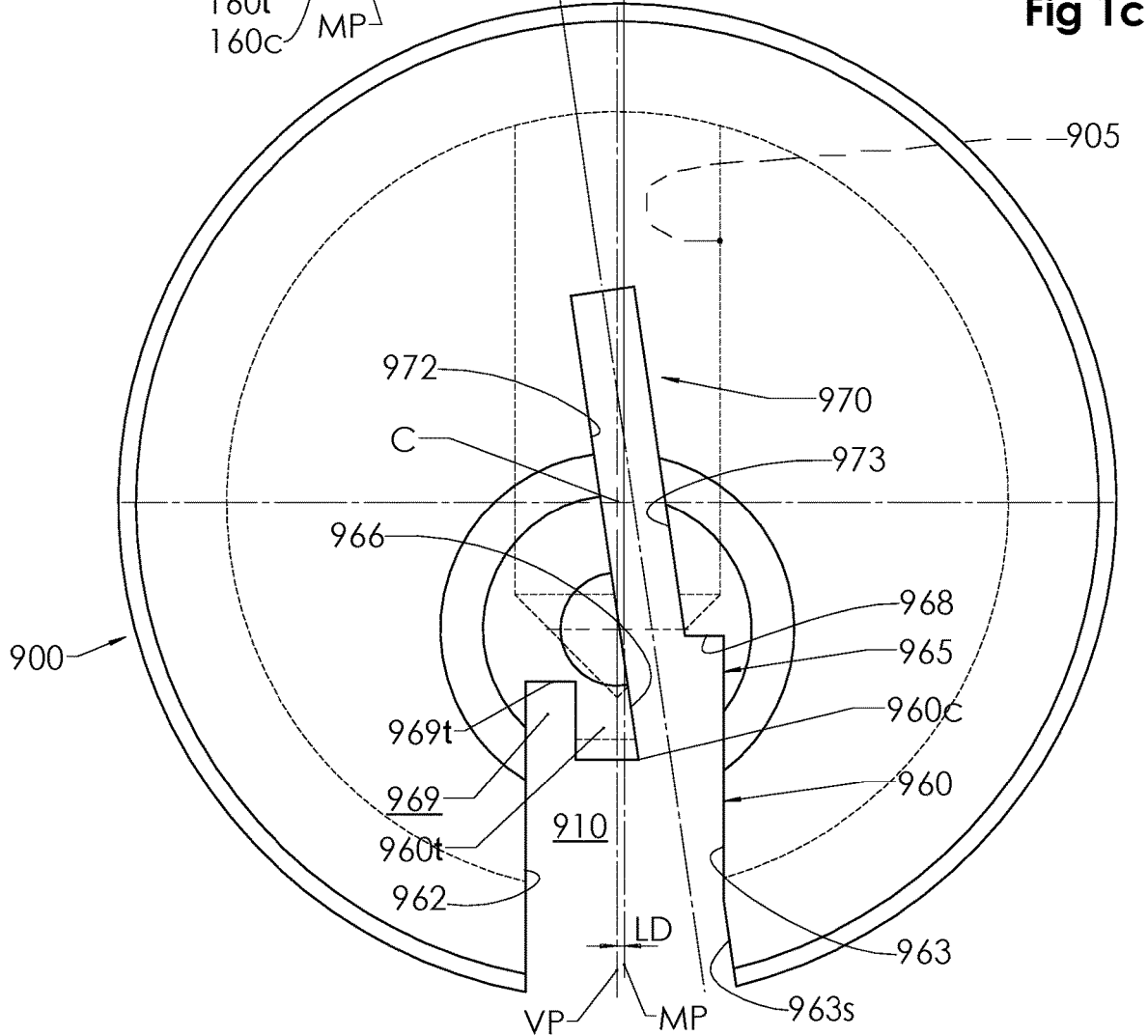

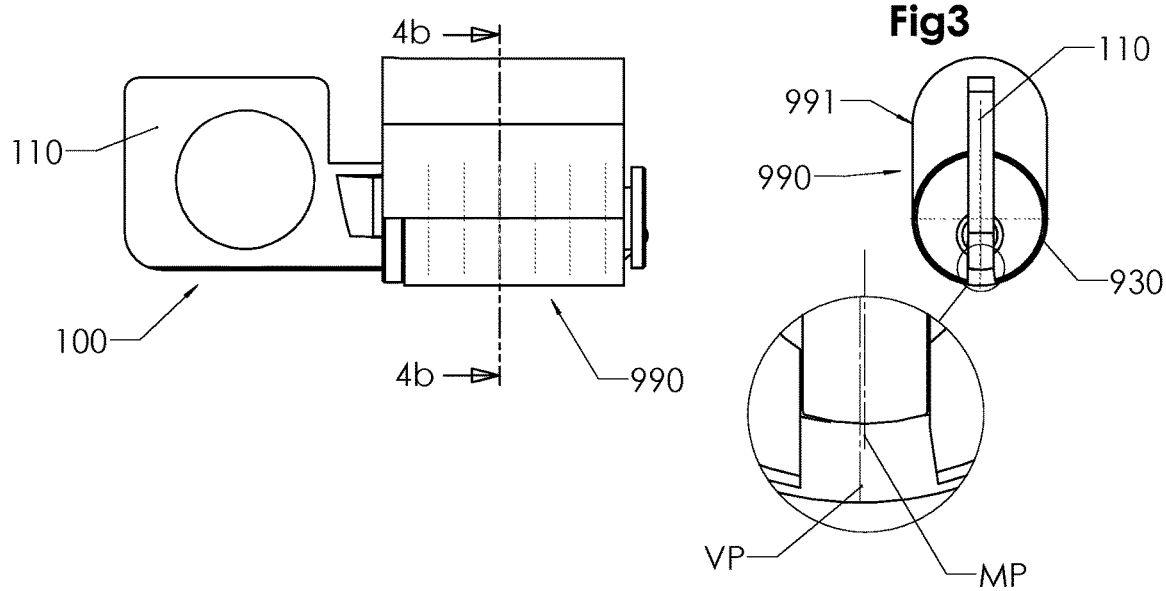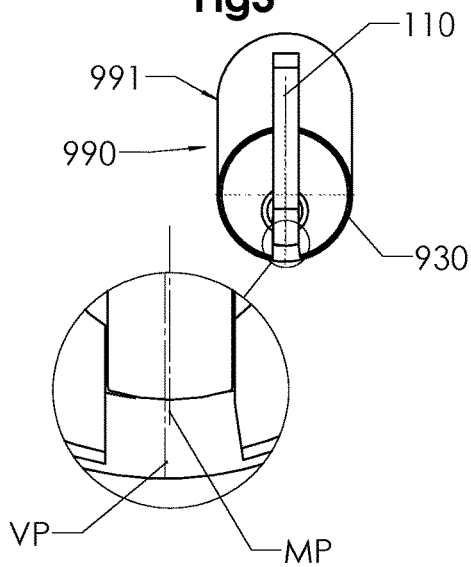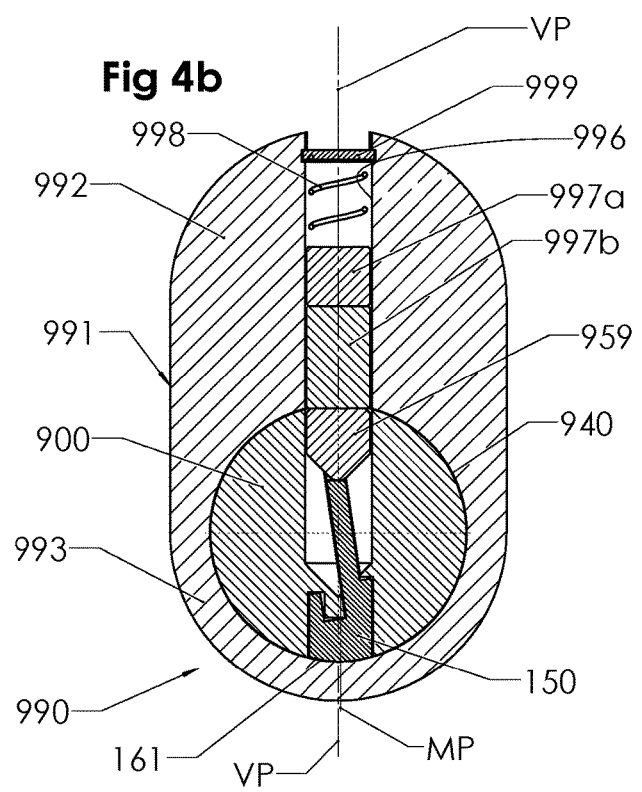

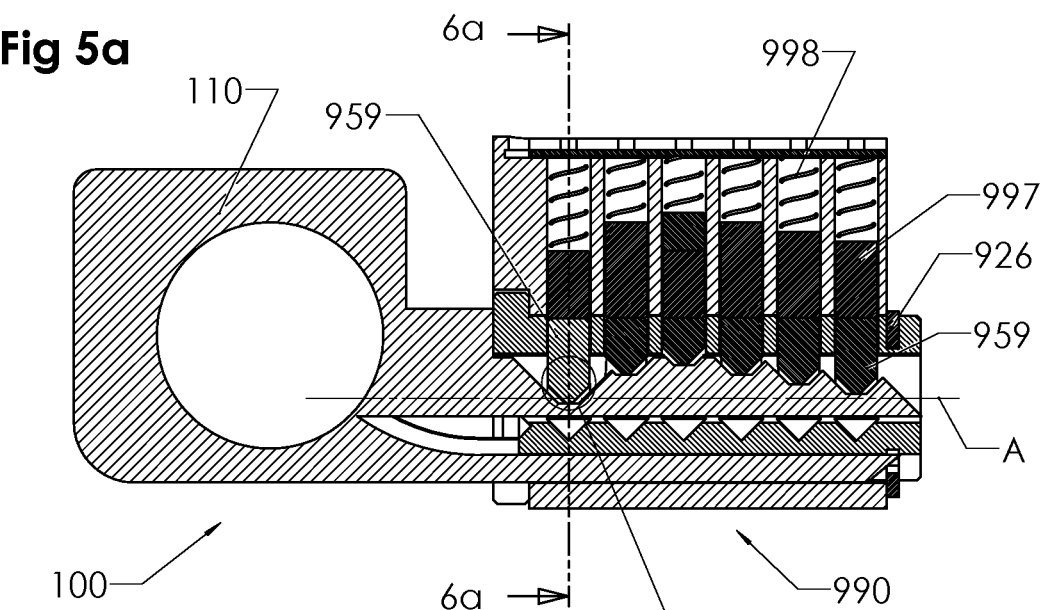
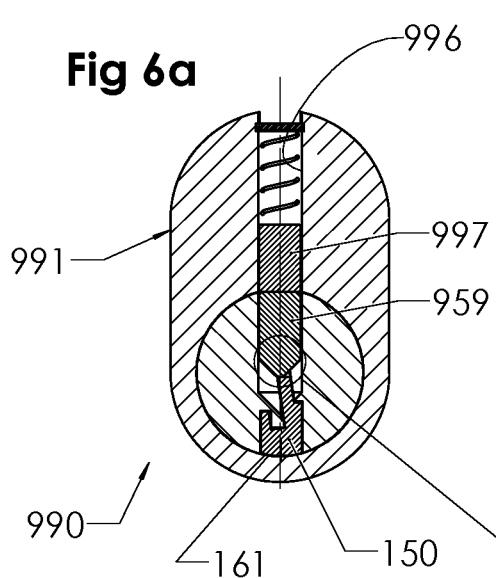
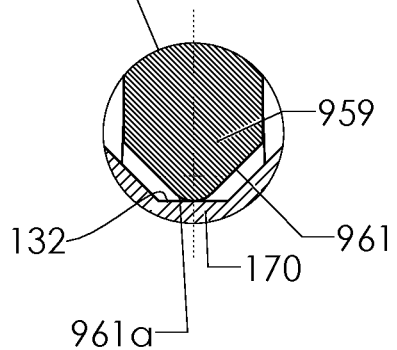
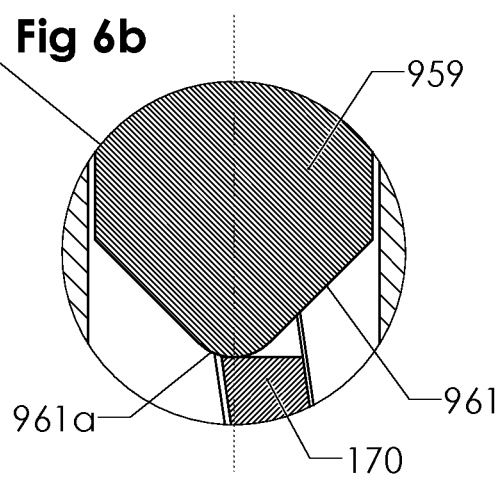

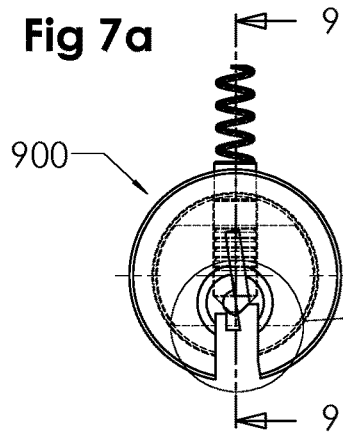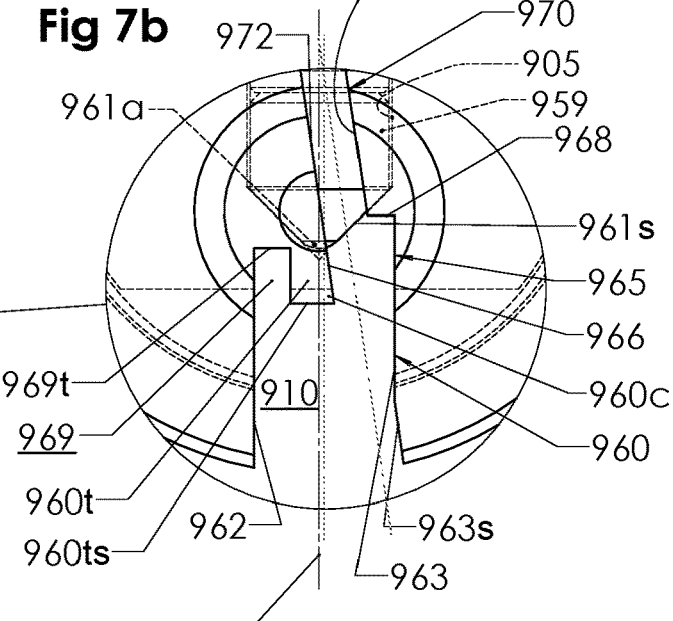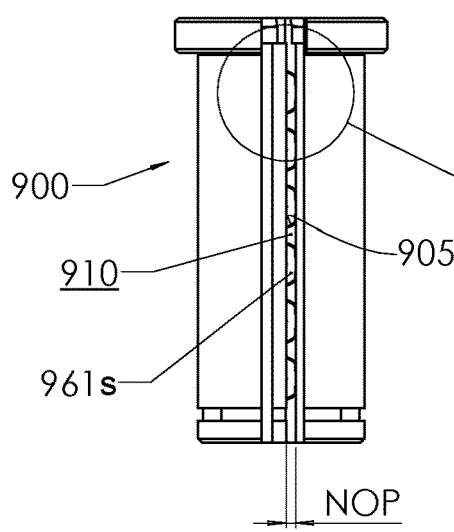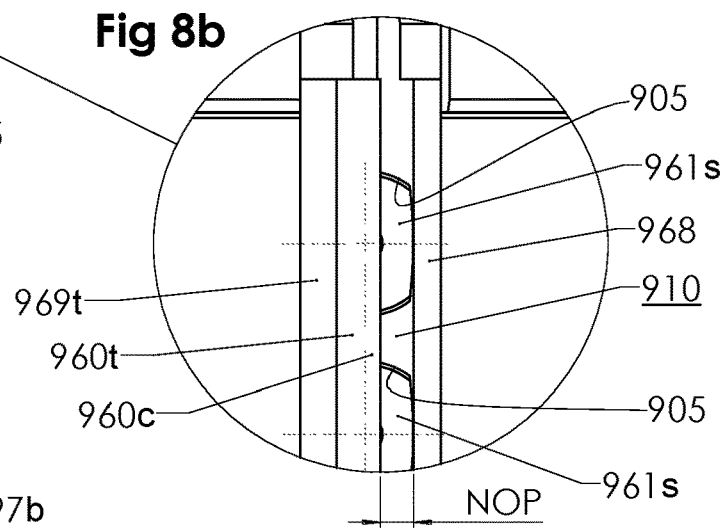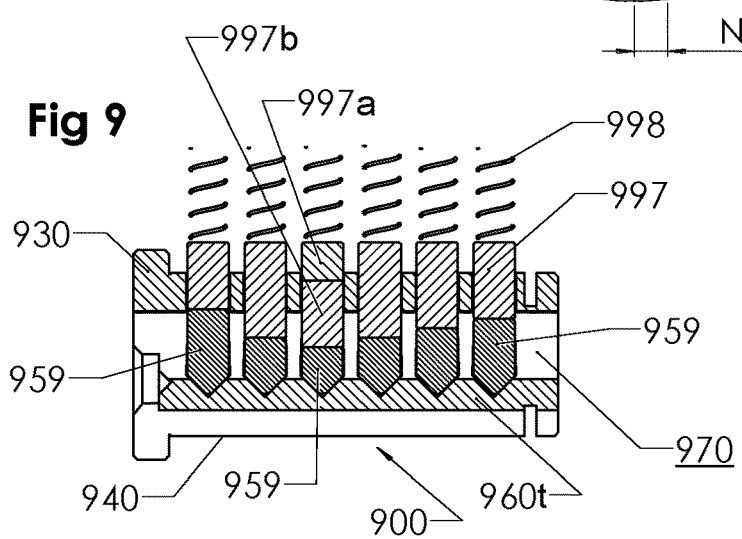

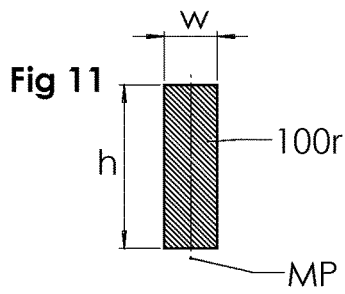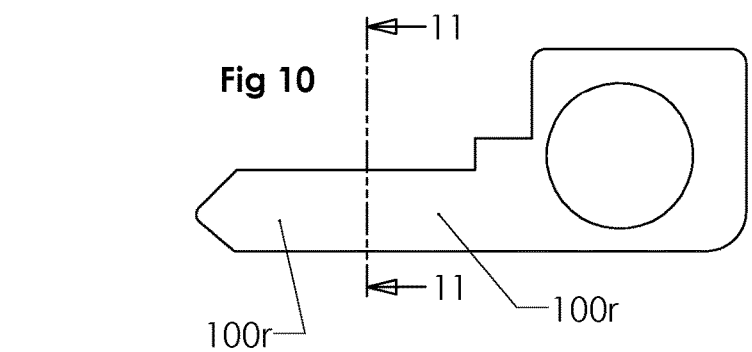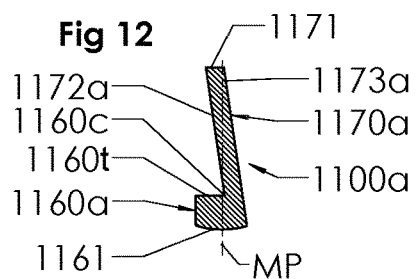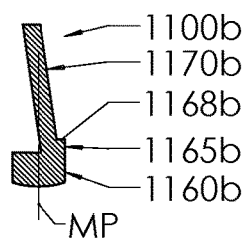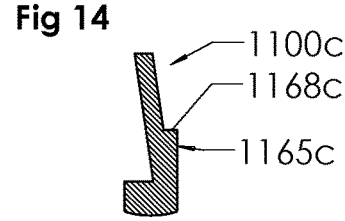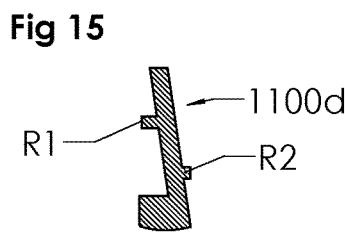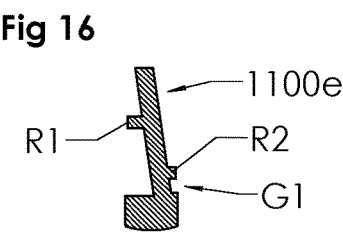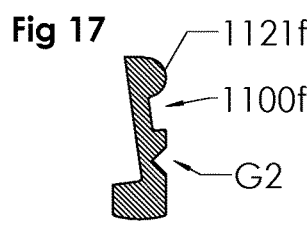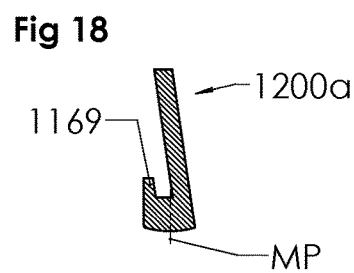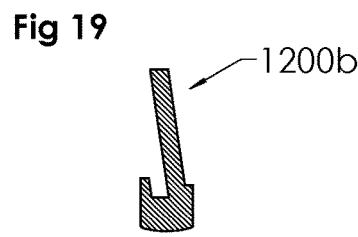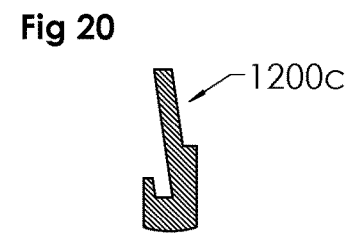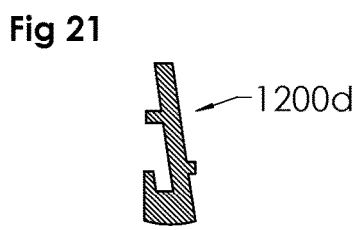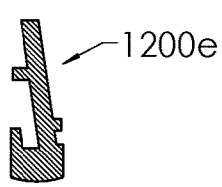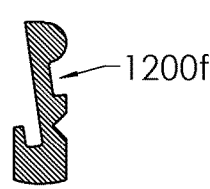

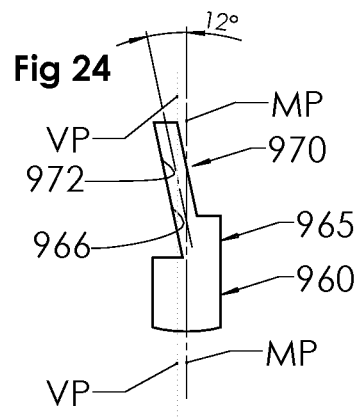
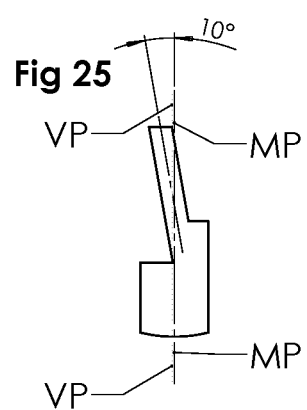
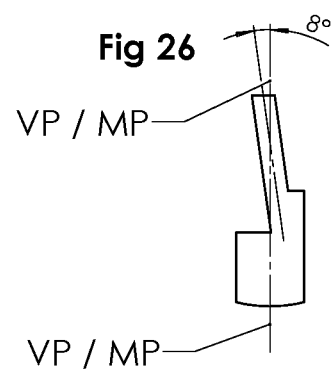
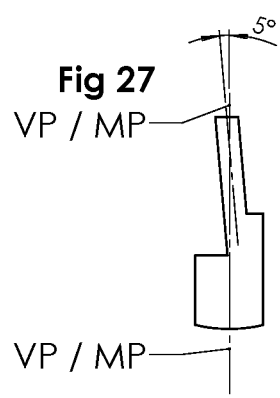
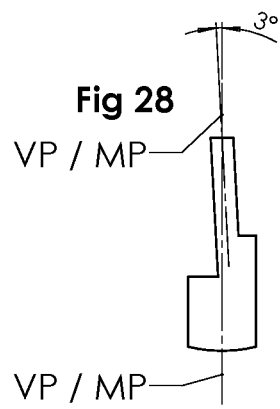

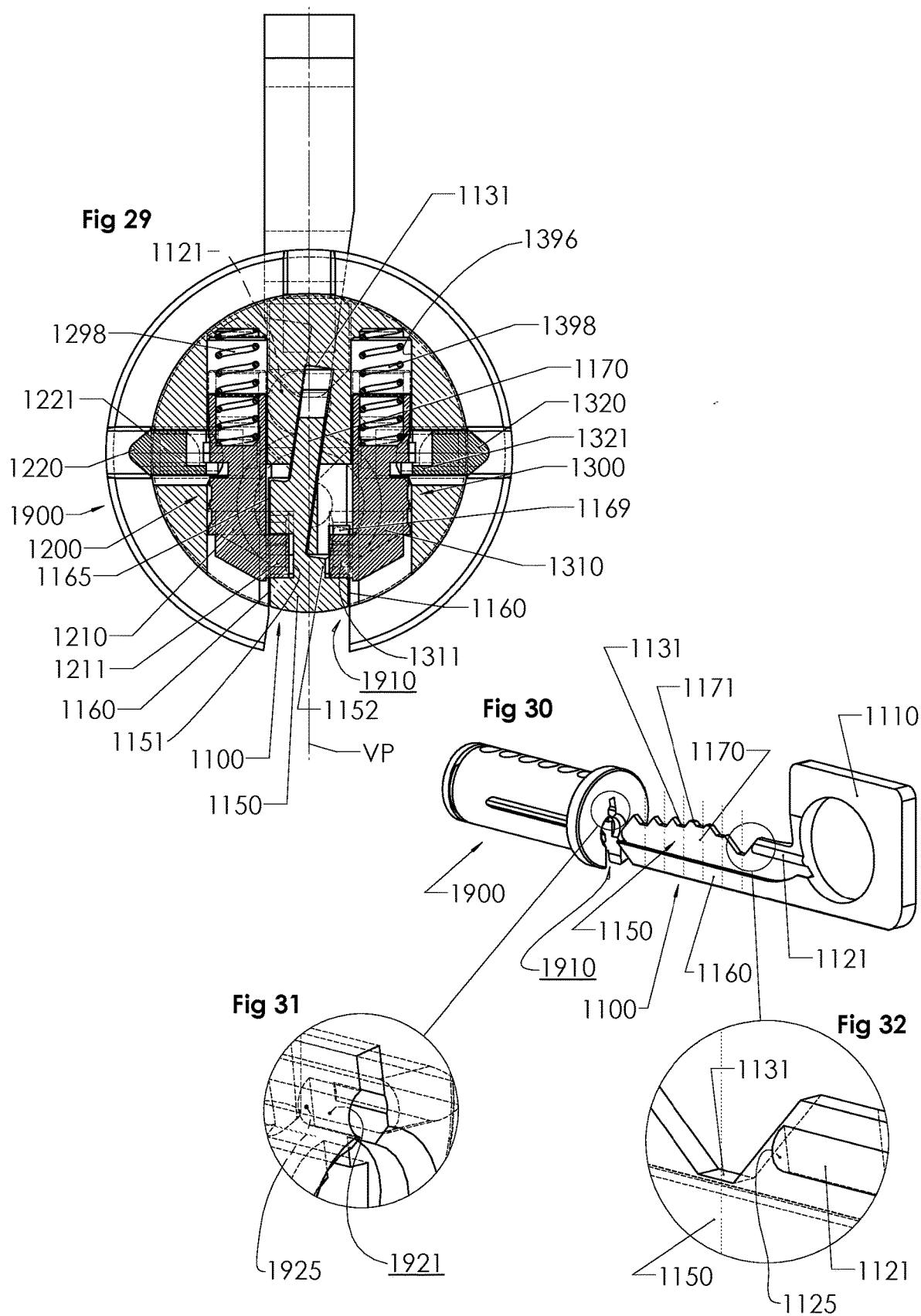

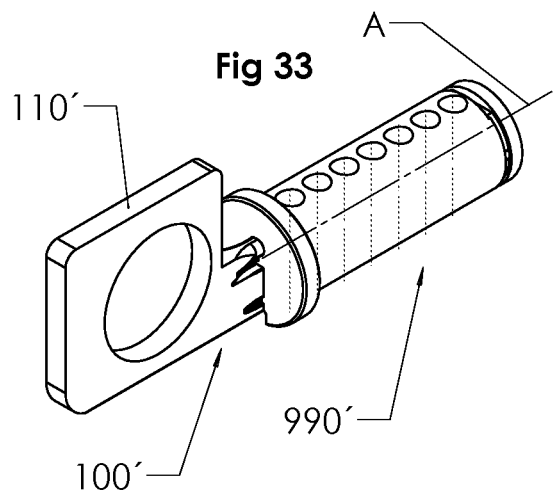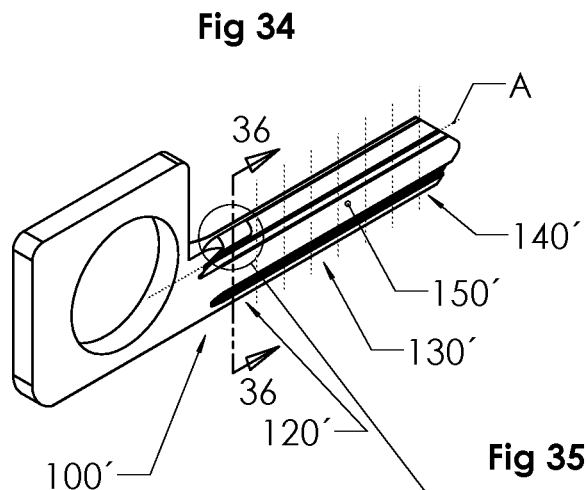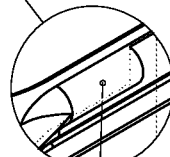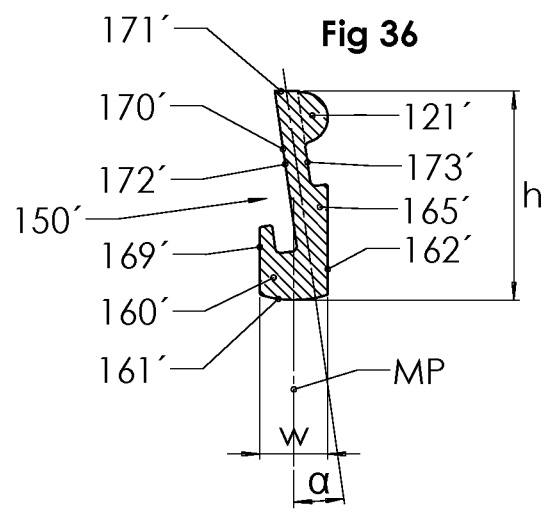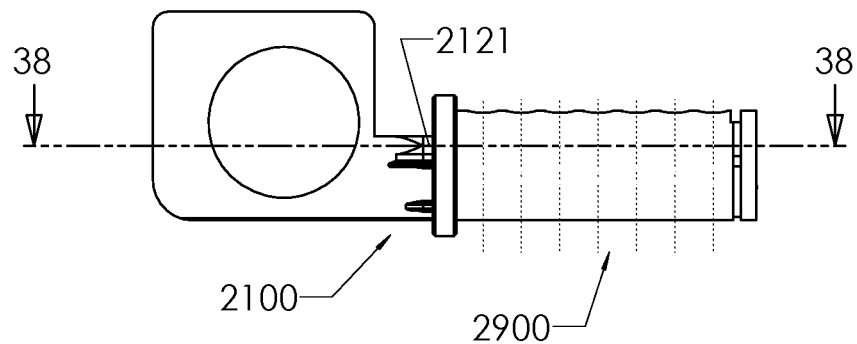

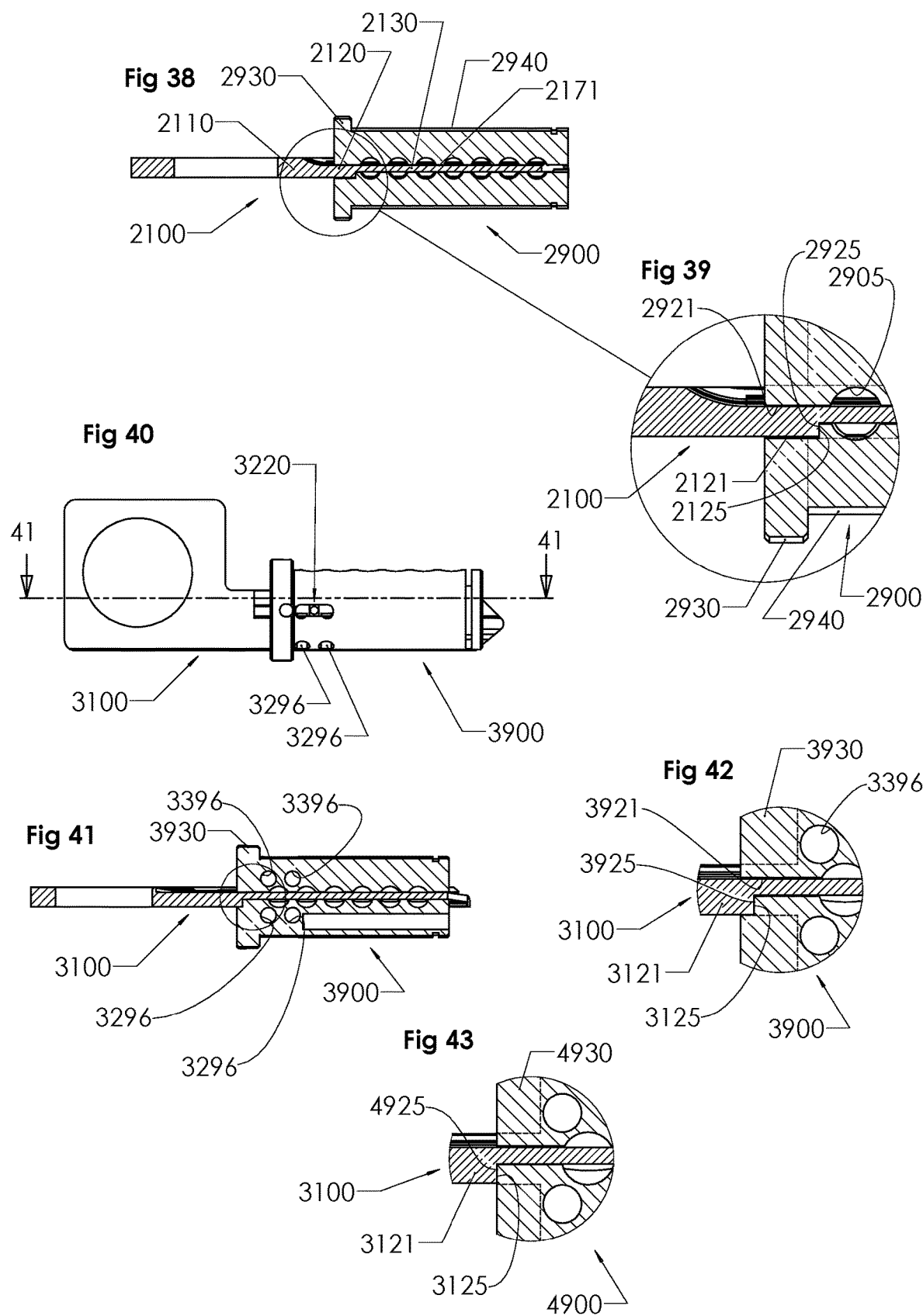

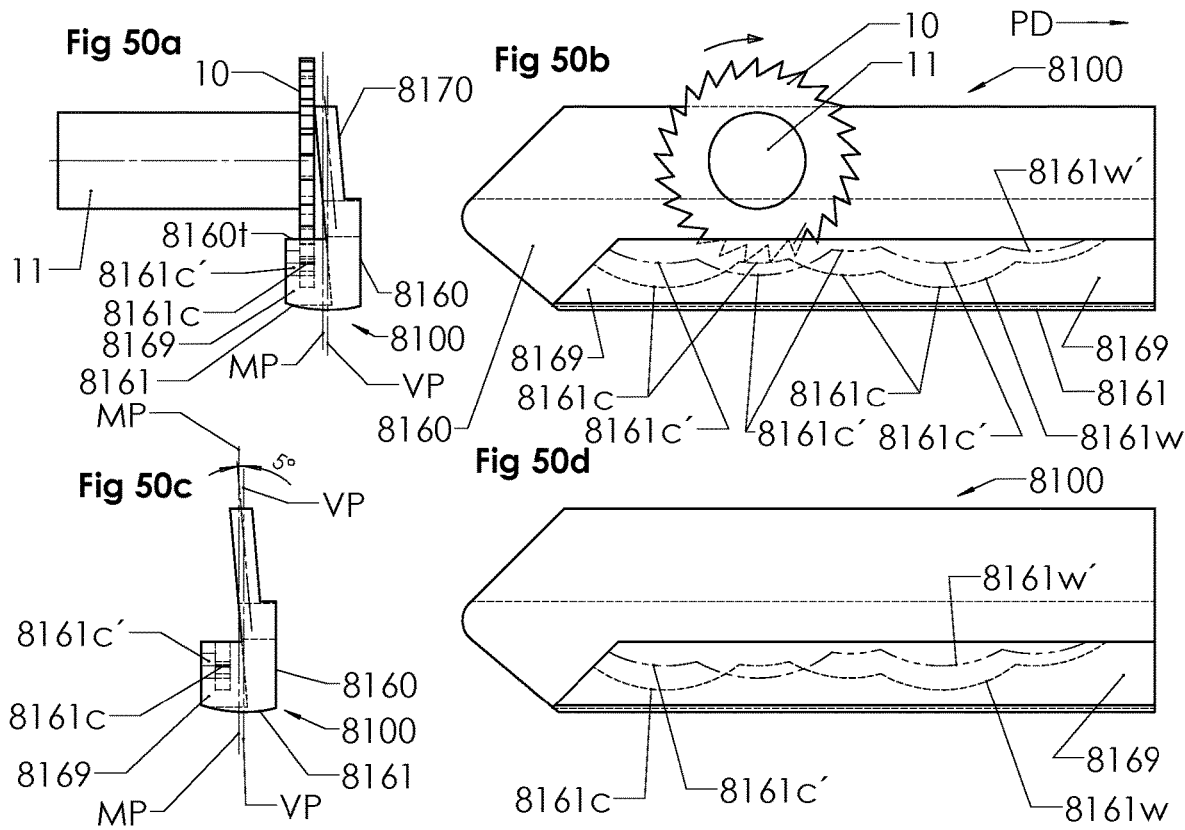
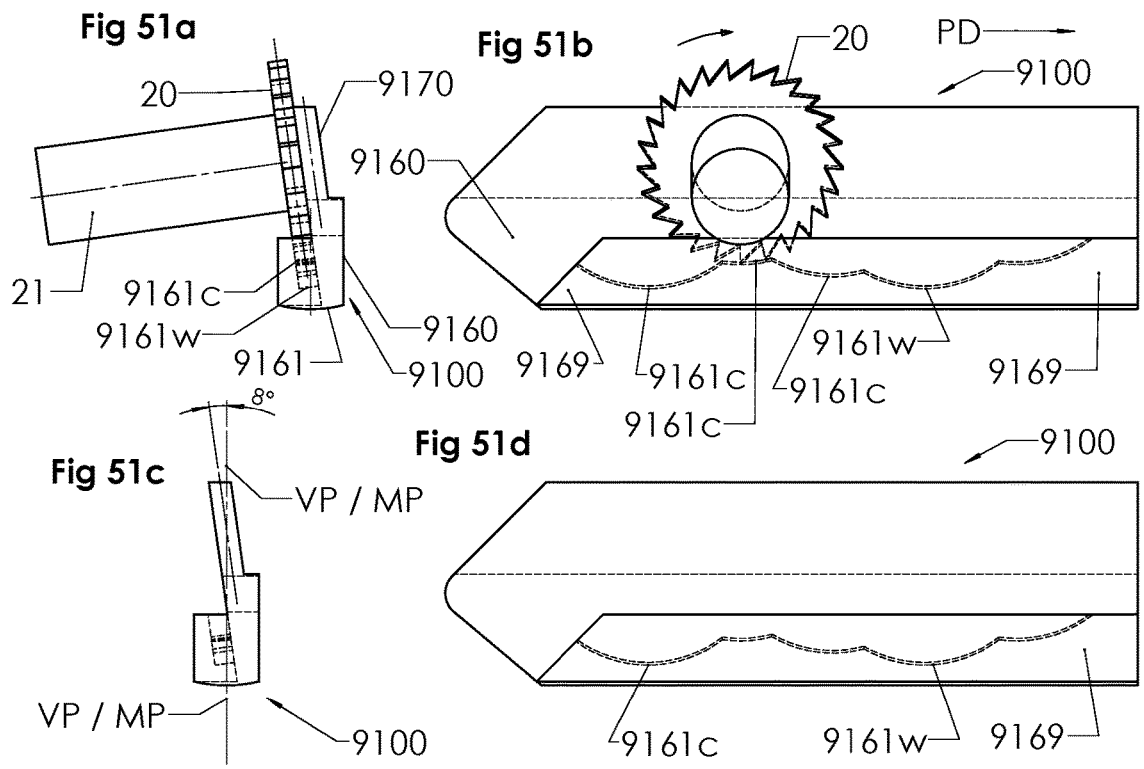

KEY BLANK, A KEY, AND A CYLINDER LOCK AND KEY COMBINATION

CROSS-REFERENCE TO RELATED APPLICATIONS

The disclosures of U.S. application Ser. No. 17/892,931 entitled A KEY BLANK, A CODED KEY AND A CYLINDER LOCK AND KEY SYSTEM WITH IMPROVED STOP ARRANGEMENT filed on Aug. 22, 2022 and U.S. application Ser. No. 17/892,992 entitled A KEY PLUG, A CYLINDER LOCK AND KEY COMBINATION AND A METHOD TO MANUFACTURE A KEY PLUG, filed on Aug. 22, 2022 the entire contents of which are hereby incorporated by reference.

FIELD OF THE INVENTION

The present invention relates to a key blank configured to fit into a keyway of a cylindrical key plug of an associated cylinder lock, wherein a substantially flat key blade extends from a grip portion along a longitudinal axis and includes a connecting portion, a major longitudinal bitting portion to be provided with a row of coded cuts, and a free tip portion. The substantially flat key blade includes a cross-sectional profile which, in the major longitudinal bitting portion, is confined within a rectangle having a height, measured in a vertical direction, being at least 2.5 times larger than a width thereof, and extends upwards in the vertical direction from a lower edge surface to an upper edge surface along a vertical mid-plane through the rectangle. The vertical mid-plane is located in the middle of the rectangle and includes at least two parts, viz. a lower, relatively wide part, including the lower edge surface and having a maximum width, measured between a first lower side surface and a second lower side surface, being the same as or slightly less than the width of the rectangle, the maximum width being 75% to 100% of the width of the rectangle, an upper, relatively narrow part, provided with the upper edge surface and being narrower than the lower part, and possibly an interconnecting part extending between the lower and upper parts along the vertical mid-plane, The "vertical mid-plane" is intended to define a plane which is located between the lateral side surfaces of the substantially flat key blade. Here, "vertical" refers to the orientation shown in the drawing figures, and "mid" is intended to define a location substantially centrally between the lateral sides of the rectangle without necessarily being located exactly in the middle between these lateral sides.

However, all parts of the substantially flat key blade should extend along the "vertical mid-plane," all the way from top to bottom.

It should also be pointed out that in this disclosure, the terms "upper," "lower," "vertical" and "horizontal" are used with reference to the illustrated embodiments and may just as well be reversed or changed to a different orientation of the substantially flat key blade when being used in practical applications.

The scope of the invention also includes a coded key as well as a cylinder lock and key combination or system.

BACKGROUND OF THE INVENTION AND PRIOR ART

Key blanks and coded keys, and associated locks forming a cylinder lock and key combination or system, have been developed gradually from a basic design created long ago, namely by Linus Yale Junior in the 1860s, and are still being improved by various measures in order to increase security against the unauthorized opening of the lock and facilitating a rational production of locks and keys in large numbers. A wide-spread overall structure of the keyway, and a substantially flat key blade of a corresponding key or key blank, includes generally a cross-sectional profile consisting of three parts, each having a specific task, viz. a lower relatively wide part, serving mainly to guide the substantially flat key blade in the keyway of the associated lock, an interconnecting part, serving to make it more difficult to manipulate the associated lock, when a key that is not properly cut is inserted into the keyway, and an upper, relatively narrow part having an edge portion serving to position a row of central locking pins of the associated lock into predetermined locations so as to release the lock.

A contemporary example of such a lock and key system is disclosed in the published European patent application EP 3,366,870 A1 (ASSA AB), where the improvement relates to a stop arrangement defining a selectable stop for the full insertion of the substantially flat key blade into the keyway of the plug, wherein the key can be turned and release the cylinder lock. The substantially flat key blade of this prior art key has a cross-sectional profile with several longitudinal grooves and ribs and also several portions that are inclined in relation to the vertical mid-plane of the substantially flat key blade. Similarly, the keyway in the key plug of the associated lock has a corresponding number of longitudinal recesses and ribs, and inclined portions, so that the substantially flat key blade will fit slidingly with some play within the keyway. In the cross-sectional profile of the substantially flat key blade and the corresponding keyway, in the part extending vertically between the lower and upper parts and thus forming an interconnecting part, there are several portions being inclined in alternating directions. The inclinational angles, relative to a central plane, are quite large, so that the adjacent portions will form relatively sharp bends therebetween. This is a type of substantially flat key blade and keyway configuration which is frequently used today in cylinder lock and key systems.

Owing to the bends between the inclined portions of the profiled keyway, the security of the associated lock is enhanced, since it is relatively difficult to reach, from below, the upper part of the keyway, where the lower ends of the locking pins are accommodated when the key has been withdrawn. Thus, it is difficult to observe or find out how to move the locking pins so as to open the lock, and the zig-zag or bent configuration of the interconnecting part of the keyway will therefore deter lock-picking attempts from below, in particular via the lower relatively wide part of the keyway. Of course, the lower relatively wide keyway is a part of the lock which is relatively easy to reach, because of its relatively large width.

OBJECT OF THE INVENTION

An object of the present invention is to provide a key blank or key with a relatively simple geometrical shape, which has no alternating directions of adjacent inclined portion and no sharp bends therebetween and which is still advantageous in respect of manufacture and use, rendering a good strength of the key blank structure, and a reliable and effective use when forming part of a lock and key combination or system.

A further object is to provide a structure of the key blank, and a corresponding key, which will further facilitate rapid and rational manufacturing of cylinder locks and key combinations in large numbers, in particular with a rational method that simplifies the manufacturing of associated locks having a keyway corresponding to the profile of the substantially flat key blade of the key blank or the coded key.

A still further object is to provide, in spite of a relatively simple geometrical shape, a structure which will maintain a sufficiently high security against manipulation and unauthorized opening of the associated lock.

SUMMARY OF THE INVENTION

According to the present invention, the above objects are met by providing a basic structure of the substantially flat key blade as recited above in the section "FIELD OF THE INVENTION," wherein the upper, relatively narrow part has a lateral width being no more than 33% of the maximum width of the lower part, and extends obliquely upwards along a first direction pointing away from the second lower side surface of the lower part and being inclined at a relatively small angle $\alpha$, in the interval of 3° to 12°, relative to the vertical mid-plane, and the sideways or lateral location, within the rectangle, of the upper relatively narrow part of the key blade, including first and second upper side surfaces thereof, is such that an imaginary downward extension thereof, substantially in a second direction opposite to the first direction, will fall onto the lower edge surface of the substantially flat key blade, at a same second side of the vertical mid-plane and inside the second lower side surface of the lower part.

With such a configuration of the substantially flat key blade, including a relatively narrow, slightly inclined upper part thereof, the above objects are achieved.

Thus, the inclinational angle $\alpha$ of the uppermost part of the key blank, relative to the vertical mid-plane, is only 3° to 12°, which is a rather small angle. Nevertheless, this small angle is significant and effective, and will provide an increased security against lock-picking, in spite of the very simple structure of the key blank, as will be explained below. The inclinational angle interval may be 5° to 10°, in particular 8° to 9°.

The "vertical mid-plane" is possibly displaced sideways, in relation to the central plane of the key plug of an associated cylinder lock, a distance of no more than 15% of the maximum width of the lower part.

Also, it will be possible to form most of the substantially flat key blade in one or a few operational steps thus enabling a rational and rapid manufacturing since these parts may be oriented substantially in one and the same inclined plane, and no special measures have to be taken to form any alternating bends being oriented in different directions.

Generally, the various surfaces of the key blank are easy to manufacture with conventional tools being used in the industry of mechanical locks and keys, including rotating cutting discs. Broaching may not be necessary, so the manufacture will be speedy and rather cost-effective.

Furthermore, a great advantage is that the key plug of an associated lock, with a keyway having essentially the same cross-sectional profile as the key blank, can be manufactured in a rapid and rational manner by using one or more rotating cutter discs, as explained in the above-mentioned related U.S. patent application Ser. No. 17/892,992.

According to an advantageous embodiment, the key blank also has the following features:

the lower relatively wide part of the substantially flat key blade includes, at a vertical level adjacent to the interconnecting part, a laterally offset region located substantially at a same lateral side of the mid-plane as the second lower side surface; an interconnecting part of the substantially flat key blade adjoins to the laterally offset region of the lower part and extends vertically upwards therefrom, with a central side surface being located in the vicinity of the vertical mid-plane and being inclined substantially in the first direction, away from the laterally offset region of the lower part, and with an outside side surface adjoining, possibly via a step-like transition, to the second lower side surface of the lower part. The upper part of the substantially flat key blade forms an upward extension of the interconnecting part, forms, at the first upper side surface, a substantially straight extension of the central side surface of the interconnecting part, and also forms, at the opposite, second upper side surface, a substantially straight surface which adjoins (downwards) to the outside surface of the interconnecting part, possibly via a step-like transition.

With such a structure, the security against lock-picking is further enhanced, since a large part of the width of the lowermost part does not adjoin to the interconnecting part, and the same will be true for the corresponding keyway of the associated cylinder lock. Accordingly, when there is no key inserted into the key plug, the upper part of the keyway will look very narrow, as seen from below, and the inclination of the relatively narrow upper part, being directed away from the laterally offset region of the lower part, will also make it more difficult to observe, reach or manipulate the central locking pins of the cylinder lock from below.

It is advantageous if the relatively narrow upper part of the substantially flat key blade is substantially uniform along the vertical extension of the upper part, possibly with a tapering uppermost portion thereof. Since the upper part is very narrow, typically only about 1 mm wide, the normal embodiment would be a uniform thickness of the entire upper part of the key blade.

Moreover, the entire inclined upper part of the key blank will be located centrally in relation to the lower part and also in relation to the vertical mid-plane, which will also facilitate manufacturing of the key blank. In particular, at least a part of each of the first and second upper side surfaces of the upper part of the substantially flat key blade is located on a first side and on a second side, respectively, of the vertical mid-plane.

In addition, a total vertical height of the interconnecting part and the upper part of the substantially flat key blade is in the interval 50% to 85% of the total height of the substantially flat key blade. Thus, the lower relatively wide part of the substantially flat key blade will have a vertical height which is relatively small and less than half of the total height, and it may have a height which is substantially less than half the total height, possibly as low as only 15% of the total height. This feature will also contribute to the security of the associated lock, since there will be a relatively large distance from the lower part of the keyway, where a picking tool may be introduced, up to the upper end of the keyway accommodating the upper part of the substantially flat key blade, including the bitting portion thereof.

Furthermore, a central side surface of the interconnecting part crosses the vertical mid-plane. In other words, the first inclined lateral surface of the interconnecting part, and a downward imaginary extension thereof, will be located entirely on the second side of the vertical mid-plane in the lower part, whereas the upwardly extended first side surface of the upper part will be located entirely on the first side of the vertical mid-plane. Such an embodiment will ensure that the entire laterally displaced region, where the lower part adjoins to the interconnecting part, is located on the second side of the vertical mid-plane, also implying that the corresponding part of the keyway of the associated lock has such a laterally displaced region which makes it more difficult to manipulate the lock so as to move the central locking pins into releasing positions when the substantially flat key blade has been withdrawn from the keyway.

Still further, the lower part of the substantially flat key blade has an upper first transverse surface located substantially on the same lateral side of the vertical mid-plane as the first lower side surface thereof, the first transverse surface forming a corner with the adjoining central side surface of an interconnecting part, the corner being located in the vicinity of the vertical mid-plane, and the first transverse surface forming at least a part of a first step-like transition between the lower part and the interconnecting part of the substantially flat key blade. In the corresponding key plug, such a corresponding transverse surface portion and corner of the key plug of the associated lock will contribute to obstruct an attempt to reach the laterally offset adjoining passage of the keyway, for example with a picking tool.

In an embodiment of the present invention, the first transverse surface of the key blank extends laterally all the way from the first lower side of the lower part to the corner, so as to form the first step-like transition. Alternatively, the first step-like transition also comprises an upward ridge extending upwards in a direction substantially in parallel to the interconnecting part, the upward ridge having an outside surface portion adjoining to the first lower side surface of the lower portion, a top surface portion, and an inside surface portion adjoining to the first transverse surface. The first transverse surface will thus form only a part of the first step-like transition. An undercut groove is formed and defined by the inside surface portion of the upward ridge, the first transverse surface with the corner, and the central side surface of the interconnecting part. Such an upright ridge will constitute a good place to arrange a side code pattern, if so desired. Also, the upright ridge will imply that a corresponding recess is formed in the keyway in the key plug of the associated lock, for accommodating the ridge, and this corresponding recess will function as a closed pocket where picking tools may be trapped in attempts to open the lock without a proper key. Accordingly, such an embodiment of the key blank will further enhance the security of the corresponding lock against manipulation.

The second upper side surface of the upper part adjoins as a substantially straight extension to the second lower side surface of the lower part, or there is also a second step-like transition on the other side of the vertical mid-plane, where the second upper side surface of the upper part adjoins to the outside surface of the interconnecting part.

On the second side, a step-like transition may form a second transverse surface portion which may be located above the level of the step-like transition on the first side, or at the same level, or at a lower level.

According to a further possible feature of the key blank, there is provided, on one or both sides of the substantially flat key blade, at least one longitudinal groove or at least one profile rib serving to provide a specific cross-sectional profile and/or a stopping arrangement which enables releasing the associated cylinder lock with a correctly configured substantially flat key blade, so that the latter will be stopped when it has reached a certain longitudinal position upon being inserted into the key plug of an associated cylinder lock.

As indicated above, the key blank may include a stopping arrangement being provided with a (first) selectable abutment surface facing in a forward direction along the longitudinal axis, wherein the (first) abutment surface on the substantially flat key blade is formed as a forward end surface of a longitudinal rib portion being located at a lateral side of the upper, relatively narrow part of the substantially flat key blade at a vertical level lying within a vertical range of the bitting portion of the substantially flat key blade, extending in parallel to the longitudinal axis of the substantially flat key blade, being confined longitudinally to the connecting portion of the substantially flat key blade, being confined also within the contour of or laterally slightly outside the rectangle, with a possible lateral extension exceeding the width of the rectangle by at most 25%, and having a selectable length, measured from the grip portion, being any desired fraction of the length of the connecting portion, whereby the location of the forward end surface of the rib portion is selectable along the whole length of the connecting portion.

In the case of a side code pattern being located on a lateral side surface portion of the key blank, each side locking mechanism may comprise at least one side locking tumbler. Such side locking mechanisms are previously known per se in cylinder lock and key systems, for example from the U.S. Pat. No. 10,337,210 B2 (Widen) relating to an interchangeable cylinder lock core for a cylinder lock unit, and the corresponding continuation-in-part U.S. Pat. No. 10,570,643 B2 (Widen) relating to a cylinder lock core for a cylinder lock unit. According to these patent specifications, there is at least one side code pattern confined entirely to a front region of the rotatable key plug of the lock, and the side locking tumblers of each side locking mechanism are movable independently of each other with at least three different code positions for each coded side locking tumbler and a plurality of different code combinations for each side locking mechanism.

In the present invention, the key blank or a key with a key code pattern possibly cooperating with a side code mechanism of the lock, the side code pattern of the substantially flat key blade (and the coded side locking mechanism of the associated lock) may extend either along only a part of the entire length of the substantially flat key blade (and along a longitudinal part of the key plug of the lock), or it may extend along substantially the entire length of the substantially flat key blade, from the grip portion to the tip of the substantially flat key blade.

Thus, a person of ordinary skill in this art may very well combine the teachings of the above two U.S. patents, without necessarily having a coded side locking mechanism being confined only to a longitudinal part of the length of the substantially flat key blade when designing a lock and key system.

As indicated above, the key blank may be provided with at least one key code pattern in the substantially flat key blade so as to form a coded key, wherein the at least one key code pattern includes a central key code pattern with a longitudinal row of coded cuts in the upper relatively narrow inclined part of the substantially flat key blade and possibly also at least one side code pattern in the lower relatively wide part.

Such side code patterns may be identical to each other or they may be different from each other.

Each side code pattern may be located inside an upright security ridge of the substantially flat key blade so as to be at least partly concealed when being observed sideways from a lateral side of the substantially flat key blade.

The side code pattern may be located at a bottom surface of an undercut groove pocket which is situated at an inside of the upright security ridge.

It is possible to provide another side code pattern in an upper portion of the upright security ridge of the substantially flat key blade, so that there are two neighbouring side code patterns side by side, including an inner wave-like side code pattern being partially concealed by a remaining portion of the security ridge. In other words, there may be a double code in the vicinity of the security ridge.

Moreover, the present invention also includes a combination of a coded key, with at least one key code pattern, and an associated lock, thus forming a cylinder lock and key combination, possibly forming part of a cylinder lock and key system with several coded keys and corresponding cylinder locks.

A corresponding or associated cylinder lock, including a key plug having a keyway with a cross-sectional profile corresponding to the key plug or coded key according to the present invention, is disclosed in a related patent application being filed by the same applicant on the same date as the present application. The disclosure of the related patent application is entitled A KEY PLUG, A CYLINDER LOCK, A CYLINDER LOCK AND KEY COMBINATION AND A METHOD TO MANUFACTURE A KEY PLUG as identified in the Cross-Reference to Related Applications paragraph set forth hereinabove.

In an embodiment of a cylinder lock and key combination according to the present invention, as indicated above, there is a rib portion forming a first abutment surface on the substantially flat key blade. If so, the key plug of the associated cylinder lock is provided with a second abutment surface either in a longitudinal bore or cavity formed on one or both lateral sides of the keyway, or by a front end surface located at a radially widened front end portion of the key plug. A release of the cylinder lock will occur when the first and second abutment surfaces make contact with each other when the coded key is inserted into the key plug of the cylinder lock.

With a structure as stated above, there will be obtained a great flexibility in designing a separate cylinder lock and key combination or system, being backwards compatible with an existing system, or in creating a totally new cylinder lock and key system, which may include various separate sub-groups of cylinder locks and keys or a hierarchical system with sub-groups of different ranks. Also, for a normal connecting portion of a key, typically of a length up to about 10 mm, the longitudinal range of the longitudinal rib portion will allow a wide span of possible lengths to be selected, such as 0 to 10 mm for a key blank or a coded key, for example for use in a small format interchangeable core type of lock.

Such a special embodiment of the key blank or the coded key, with a stopping arrangement including a longitudinal rib portion on the key blank or coded key, is disclosed in another separate patent application being filed by the same applicant on the same date as the present application. The disclosure of this separate patent application is entitled "A KEY BLANK, A CODED KEY AND A CYLINDER LOCK AND KEY SYSTEM WITH IMPROVED STOP ARRANGEMENT" as identified in the Cross-Reference to Related Applications paragraph set forth hereinabove.

An advantageous effect of the structure with one or more longitudinal rib portions, is that each of the longitudinal rib portion, by way of its lateral integration in one piece with the relatively narrow upper part of the substantially flat key blade in the connecting portion, forms a reinforcement of the coded key in the connecting portion thereof.

The key blanks of the present invention are normally made of brass or of a nickel-silver alloy. Alternatively, they can be made of other metals, such as steel or aluminium.

Typical methods of production include stamping, milling and coining,

Usually, the key grip will be unitary in one piece with the connecting portion and the major longitudinal part of the substantially flat key blade. However, it is also possible to make key blanks as cutting lengths of a drawn elongated bar, and subsequently add on separate grip portions on each cutting length.

Further possible manufacturing methods are sintering, casting and also additive methods in a wide range of materials, such as polymers, metals and metal alloys, including 3D printing methods.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1a shows, in a perspective view, a key according to the present invention, and an associated cylinder lock with a housing and a rotatable key plug;

FIG. 1b shows a cross-sectional profile of the substantially flat key blade in FIG. 1a;

FIG. 1c shows, in a larger scale, an end view of the key plug of FIG. 2;

FIG. 2 shows, in an exploded perspective view, the key, the key plug and the housing of FIG. 1a, including a row of central locking pins and other internal components of the cylinder lock and key combination;

FIG. 3 shows, in an end view, the key and the lock of FIGS. 1a and 2, the key being inserted into the key plug of the cylinder lock;

FIG. 4a shows, in a side view, the key and the cylinder lock of FIGS. 1a, 2 and 3;

FIG. 4b is a cross-sectional view of the key and the cylinder lock, taken along the line 4b-4b in FIG. 4a;

FIG. 5a shows, in a longitudinal sectional view, the key being inserted into the cylinder lock of FIG. 4a, illustrating also the upper and lower central locking pins cooperating and engaging with V-cuts in the upper part of the substantially flat key blade;

FIG. 5b shows, in a larger scale, a detail from FIG. 5a, illustrating the contact between one of the lower locking pins and a V-cut of the substantially flat key blade;

FIG. 6a shows a cross-sectional view, taken along the line 6a-6a in FIG. 5a, of the cylinder lock and the inserted substantially flat key blade;

FIG. 6b, shows, in a larger scale, a detail from FIG. 6a, illustrating the contact between the lower locking pin and the V-cut shown also in FIG. 5b;

FIG. 7a is a detailed front view of the key plug, illustrating how the keyway communicates with a central bore accommodating a lower central locking pin, there being no key inserted into the keyway;

FIG. 7b is an enlarged detail from FIG. 7a;

FIG. 8a is a view of the key plug from below, illustrating how the central bores are only partially accessible from underneath via a narrow opening passage;

FIG. 8b is an enlarged detail from FIG. 8a;

FIG. 9 is a longitudinal vertical section of the key plug, taken along the line 9-9 in FIG. 7a;

FIG. 10 shows schematically a side view of a rectangular blade with a grip portion from which a key blank according to the invention may be machined;

FIG. 11 is a cross-sectional view taken along the line 11-11 in FIG. 10, showing the rectangular blade;

FIGS. 12, 13 and 14 illustrate three variants of a first embodiment of a key blank according to the invention, formed from the rectangular blade of FIGS. 10 and 11;

FIGS. 15, 16 and 17 illustrate further variants of the first embodiment;

FIGS. 18, 19 and 20 illustrate three variants of a second embodiment of a key blank according to the invention;

FIGS. 21, 22 and 23 illustrate three further variants of the second embodiment;

FIGS. 24, 25, 26, 27 and 28 show various profiles of the keyways configured to slidingly receive keys of the kind shown in FIG. 13, indicating different inclinational angles of the upper and interconnecting parts of the keyway (and thus also of the corresponding substantially flat key blade);

FIG. 29 shows, in a cross-sectional view, a key plug with a keyway, in which a key according to the present invention cooperates with two side locking mechanisms on both lateral sides of the keyway of the key plug;

FIG. 30 shows, in a perspective view, the key and the key plug of FIG. 29, with the key being located outside the key plug and also illustrating a stop arrangement in two enlarged views;

FIGS. 31 and 32 show two enlarged details from FIG. 30;

FIG. 33 shows, in a perspective view, a key plug with an inserted key with an improved stop arrangement;

FIG. 34 is a perspective view illustrating only the key of FIG. 33;

FIG. 35 is an enlargement of a detail in FIG. 34;

FIG. 36 is a cross-section taken along the line 36-36 in FIG. 34;

FIG. 37 shows in a side view the key and the key plug of FIGS. 33 to 36;

FIG. 38 is a longitudinal horizontal sectional view along the line 38-38 in FIG. 37 illustrating the stop arrangement;

FIG. 39 is an enlarged detail from FIG. 38;

FIG. 40 is a side view of a key inserted into a key plug, being similar to the key and key plug of FIGS. 33 to 39 but being also provided with a coded side locking mechanism with a side bar;

FIG. 41 is a longitudinal horizontal section taken along the line 41-41 in FIG. 40;

FIG. 42 is an enlarged detail of FIG. 41, illustrating the interaction between a key provided with a longitudinal rib portion and a key plug with a radially widened portion being enlarged in a longitudinal direction;

FIG. 43 shows a variant of the key having a longitudinal rib portion and the interaction with a key plug forming a part of an existing cylinder lock and key system;

FIGS. 50a, 50b, 50c and 50d illustrate how one or two code patterns can be formed by a cutting tool, with a vertically oriented rotating cutting disk, at a side portion of a lower part of the substantially flat key blade, one such code pattern being at least partially concealed at the inside of a ridge portion; and FIGS. 51a, 51b, 51c and 51d illustrate, in similar views, how the code patterns may be formed by a cutting tool with a rotating cutting disc being inclined somewhat in relation to a vertical plane.

Figure 44:
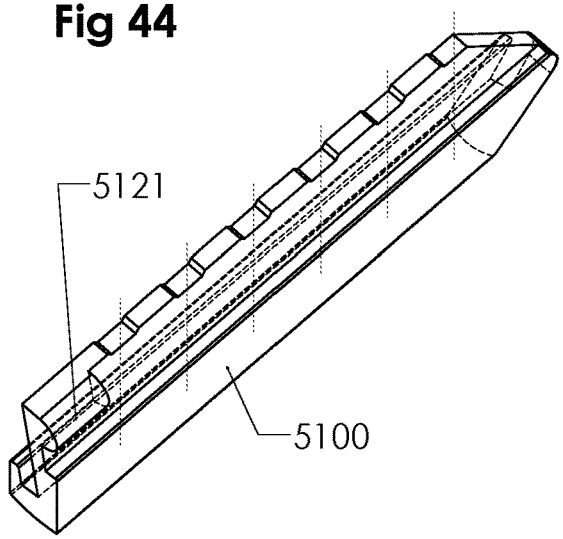
FIGS. 44 and 45 show, in a perspective view and a cross-sectional view, respectively, a substantially flat key blade provided with a longitudinal rib portion on one lateral side, and the substantially flat key blade being inserted into a key plug of an associated cylinder lock.

DETAILED DESCRIPTION OF SOME PREFERRED EMBODIMENTS OF A KEY BLANK, A CODED KEY AND A CYLINDER LOCK AND KEY COMBINATION OR SYSTEM ACCORDING TO THE INVENTION

Basic Structure of the Cylinder Lock and Key Combination

In FIGS. 1a to 9, there is shown schematically a cylinder lock and key combination, including a cylinder lock 990 and a key 100, the latter being formed from a key blank 100' (see FIGS. 12 to 23 and FIG. 34) of the present invention.

The key 100 includes (see FIG. 2) a grip portion 110 and a substantially flat key blade 150 extending from the grip portion 110 via a connecting portion 120 and a bitting portion 130 (provided with coded cuts) to a free tip portion 140. The substantially flat key blade 150 has a lower edge surface 161 and an upper edge surface 171 which forms a central key code pattern in the form of V-cuts 131a, 131b, 131c, 131d, 131e, 131f.

As appears from FIG. 1b and FIG. 4b (and also FIGS. 12 to 23), the substantially flat key blade 150 may be made in one piece and has a cross-sectional profile consisting of three parts, from the lower edge surface 161 to the upper edge surface 171, viz. a lower part 160, an interconnecting part 165 and an upper part 170. It should be noted that it is possible to leave out the interconnecting part 165 and have a substantially flat key blade with just a lower relatively wide part and an upper relatively narrow part as described hereinafter.

The associated lock 990 (see FIG. 2) comprises a housing 991 and a rotatable cylindrical key plug 900. The housing 991 has an elongated cross-section (compare also FIGS. 3, 4b and 6a) with an upper part 992 and a lower part 993. The lower part 993 has a longitudinally extending cylindrical bore 995, in which the cylindrical key plug 900 is rotatably journaled.

In the upper part 992 of the housing 991 (see FIGS. 2, 4b and 6a), there is a row of central bores 996, in the example six of them normally situated with their axes located in a vertical central plane VP coinciding with the vertical midplane MP of the substantially flat key blade 150 when the latter is inserted into the key plug 900 (and the key plug 900 is in its releasing or non-locking position, as shown in FIGS. 4b and 6a). Each central bore 996 accommodates an upper locking pin 997, one of them being divided into a first part 997a and second part 997b, each of these upper locking pins 997, 997a, 997b being biased downwardly by a helical spring 998. The upper ends of the helical springs 998 are held in place by a cover plate 999.

In the example shown, with the correctly cut substantially flat key blade 150 of the key 100 inserted into the key plug 900 of the lock 900, the upper locking pins 997, 997a, 997b are positioned with their lower ends located at a shear line at the cylindrical surface of the bore 995, so that the key plug 900 may rotate therein, as will be understood from FIGS. 4b, 5a and 6a.

The rotatable key plug 900 (see FIG. 2) has an outer cylindrical surface 940 fitting with a small play inside the cylindrical bore 995 of the housing 991 and, at a front end portion 901, a radially widened end portion 930, which has a larger radius than the cylindrical surface 940 and serves to hold the key plug 900 in place longitudinally in the lower part 993 of the housing 991, together with a stop member formed by a resilient stop ring 926 at a rear end portion 902 of the key plug 900.

The key plug 900 has a row of central bores 905, also six of them, with the same diameter and spacing as the bores 996 of the housing 991. Accordingly, the upper locking pins 997, 997a may be pushed down into the central bores 905 of the key plug, if and when the substantially flat key blade 150 of the key 100 is withdrawn from the key plug 900 of the lock 990 (compare FIG. 9).

The central bores 905 of the key plug 900 accommodate a corresponding number (six of them) of lower locking pins 959. As appears from FIGS. 5b and 6b, the lower ends of the lower locking pins each have a tapered end portion 961 with a smoothly rounded apex 962, either a conical end portion, as shown, or an end portion formed as a chisel. The end portions 961 will contact, with their apexes 961a, each one of the above-mentioned V-cuts 131a to 131f cut in the upper edge surface 171 of the substantially flat key blade 150, each with a short planar bottom 132 which is horizontal (as seen in FIG. 5b) and parallel to the longitudinal direction A of the substantially flat key blade 150.

As appears from FIGS. 4b and 6a, the lower edge surface 161 of the lower relatively wide portion 160 of the substantially flat key blade 150 is part-cylindrical with the same curvature as the cylindrical surface 940 of the key plug 900 (compare also FIG. 1b).

The lock and key combination has a configuration of a substantially flat key blade 150 having an inclined upper part 170 and an adjoining inclined lateral side surface of the interconnecting part 165 (and the corresponding geometrical shape of the keyway). Thus, according to the present invention, the cross-sectional profiles of the substantially flat key blade 150 (FIG. 1b and FIGS. 12 to 23) and the corresponding keyway 910 are novel and include a combination of features with a relatively narrow upper part 170/970 which is slightly inclined in relation to a vertical mid-plane MP. The inclinational angle α is rather small, in the interval 3° to 12°, possibly 5° to 10°, in particular about 8°, as shown in FIGS. 24 to 28.

It is to be noted, however, that the very simple configuration of the substantially flat key blade 150 of the key 100 (FIG. 1b) or key blank from which it is formed, and the corresponding keyway 910 (FIG. 1c) of the associated cylinder lock 990 makes quite a difference thanks to the inclined upper part 170/970 of the substantially flat key blade/keyway, which extends obliquely upwards along a first direction P1 (see FIG. 1b), with the above-mentioned inclinational angle α (see FIG. 1c), and points away from the second lower side surface of the lower part. Moreover, the sideways or lateral location, within the rectangle, of the upper relatively narrow part of the key blade/keyway, including the first and second side surfaces/side walls thereof is such that an imaginary downward extension thereof, substantially in a second direction P2 opposite to the first direction P1, will fall onto the lower edge surface 161/outer contour at a same second side of the vertical mid-plane MP (to the right in FIG. 1b) and inside the second lower side surface 163 of the lower part 160 of the substantially flat key blade 150. Similarly, the cross-sectional profile of the corresponding keyway 910, in which the substantially flat key blade is fitted slidingly, has an upper part 970 being inclined in the same way as the upper part 170 of the substantially flat key blade 150, and the upper side walls of the upper part 970 of the keyway are also configured in the same way as the side surfaces of the substantially flat key blade 150.

As indicated above in respect of the geometrical configuration of the substantially flat substantially flat key blade 150, the cross-sectional profile is confined within a rectangle having a height h (FIG. 1b) which is at least 2.5 times larger than a width w thereof.

In the particular embodiment shown in FIG. 1b, the lower relatively wide part 160 of the substantially flat key blade includes a laterally offset region 164 located at a same lateral side of the mid-plane MP as the second lower side surface 163 of the lower part 160. An interconnecting part 165 adjoins to this laterally offset region 164 and extends vertically upwards therefrom. The interconnecting part 165 has a central side surface 166 located in the vicinity of the vertical mid-plane MP and is inclined in the first direction P1, away from the offset region 164. An outside side surface 167 of the interconnecting part 165 adjoins to the second lower side surface 163 of the lower part 160. The upper part 170 forms an upward extension of the interconnecting part 165, with a straight extension of the central side surface 166. Also, the upper part 170 forms, at the opposite second upper side surface 173, a straight surface which adjoins (downwards) to the outside surface 167 of the interconnecting part 165, via a step-like transition 168.

The upper part 170 is uniformly wide, in this embodiment and normally, along the entire vertical extension thereof. In a possible alternative embodiment, it may be tapered upwardly in its uppermost part.

As appears from FIG. 1b (compare also FIG. 24), at least a part of the first and second upper side surfaces 172, 173 of the upper part 170 of the substantially flat key blade 150 are located on a first side (to the left) and on a second side (to the right), respectively, of the vertical mid-plane MP.

In this embodiment, a total height of the interconnecting part 165 and the upper part 170 of the substantially flat key blade 150 is almost 80% of the total height h of the substantially flat key blade 150. According to the invention, this ratio may be in the interval 50% to 85%. Of course, corresponding geometrical relations will apply to the keyway 910 shown in FIG. 1c.

According to a further aspect of the invention, the central side surface 166 of the interconnecting part 165 crosses the vertical mid-plane MP, in the shown embodiment, very close to the upper end of the interconnecting part 165.

The lower part 160 of the substantially flat key blade 150 has an upper first transverse surface 160t located substantially on the same side of the mid-plane MP as the first lower side surface 162. This transverse surface 160t will form a corner 160c with the adjoining central side surface 166 of the interconnecting part 165. The corner 160c is located in the vicinity of the vertical mid-plane MP. In the shown embodiment, the transverse portion 160t forms a part of a step-like transition between the lower part 160 and the interconnecting part 165. Alternatively, the transverse surface 160t may extend laterally all the way from the first lower side surface 162 to the corner 160c, so that the transverse surface forms a rather long step-like transition. Such an embodiment is shown in FIGS. 12 to 17.

In the embodiment of FIG. 1b, and the one shown also in FIGS. 18 to 20, the step-like transition (to the left in FIG. 1b) includes an upward ridge 169, which extends in parallel to the interconnecting portion 165. The ridge 169 has an outside surface portion 169o adjoining (downwards) to the first lower side surface 162, a top surface portion 169t and an inside surface portion 169i adjoining to the first transverse surface 160t. Thus, the first transverse surface 160t forms only a part of the first step-like transition, and there is formed an undercut groove being defined by the inside surface portion 169i of the ridge 169, the first transverse surface 160t with the corner 160c, and the central side surface 166 of the interconnecting part 165. On the right hand side of FIG. 1b, the second upper side surface 173 adjoins to the outside surface 167 of the interconnecting part 165 via the step-like transition 168.

Two basic embodiments of the substantially flat key blade having a slightly inclined upper part 170 are shown in FIGS. 12 to 23, where a first embodiment has a long step-like transition with a transverse surface extending all the way from the first lower side surface 162 to the corner 160c, and a second embodiment has an upward ridge portion 169 extending a limited distance in parallel to the interconnecting portion 165.

It should be noted that the keyway 910 of the key plug may be somewhat displaced in relation to the central vertical plane VP passing through the rotary axis C (FIG. 1c) of the cylindrical part 940 of the key plug 900. Thus, the mid-plane MP of the keyway 910 may be displaced laterally sideways with a lateral distance LD being no more than 15% of the width w of the rectangle R within which the substantially flat key blade 150 (and thus also the keyway 910) is confined.

The above described basic configuration of the substantially flat key blade (and a corresponding key blank without coded cuts) and the corresponding keyway of the key plug, will facilitate a rapid and rational manufacturing of key blanks or coded keys and associated locks in large numbers in a cost-effective way, without the need for different portions in the intermediate part to be oriented in alternating directions and sharp bends therebetween. Also, the security of the associated locks, against manipulation and picking the lock, will be maintained at a sufficiently high level, as will be discussed below.

Security Against Manipulation of the Lock of the Cylinder Lock and Key Combination As appears from FIGS. 7a and 7b, owing to the basic structure of cylinder lock and key combination described above, the interconnecting part 965 and the upper part 970 of the keyway 910 are constricted laterally, so as to establish a free visual communication between the lower relatively wide part 960 of the keyway 910 and each central bore 905 in the upper part of the key plug 900, accommodating a respective lower central pin 959, only through a narrow opening passage. This narrow opening passage NOP, as seen from below along the vertical plane VP (FIG. 7b), is defined, see especially FIGS. 8a and 8b, by a corner portion 960c of a downwardly directed tongue 960t of the key plug material and by a transverse surface 969t forming a step-like transition of the keyway 910. It will be apparent from FIGS. 7b and 8b that only a side portion 961s of the tapered (conical) end portion 961 (FIGS. 5b and 6b) of each lower locking pin 959 is visible and accessible from below, when the key 100 has been withdrawn from the keyway 910.

More particularly, as will be seen from FIG. 8b, the segment or side portion 961s of each locking pin end portion 961, which is visible and accessible from below, does not include the apex 961a (FIG. 6b) of the conical end portion 961, since the apex is concealed by the corner portion 960c of the downwardly directed tongue 960t, due to the inclined direction of the interconnecting and upper parts 965, 970 of the keyway and the laterally offset location of the narrow opening passage NOP in relation to the vertical axes of the bores 905 defining the vertical central plane VP. Accordingly, it will be difficult, by optical or mechanical inspection to determine how far each lower locking pin 959 has to be moved upwards in order to be positioned with its upper end surface at the releasing shear line, i.e. the positions shown in FIG. 5a. Of course, as shown in FIG. 9, all the lower locking pins 959 are held in their lowermost positions by means of the upper locking pins 997, 997a, 997b and the helical springs 998, and there is therefore no easy way to distinguish one from the other in respect of their coded lengths or heights.

As appears best from FIGS. 1c and 7b, the lower relatively wide part 960 of the keyway 910 extends upwards on both sides of the vertical central plane VP, with lateral side wall portions 962, 963 being substantially parallel to each other, except for a lowermost, slanted surface portion 963s (possibly being formed in the part 930 of the key plug when forming an initial keyway slot by means of a rotating cutter disc), up to the downwardly directed tongue 960t. From there, the keyway 910 continues upwards on the second side (to the right) of the corner portion 960c of the tongue 960t. On the first side, to the left of the tongue 960t, it extends up to a transverse, substantially horizontal surface 969t, which forms together with the tongue 960t a lateral recess or pocket 969 of the width of the keyway 910, leaving only a narrow opening passage NOP (FIGS. 8a and 8b) on the second, right hand side of the keyway. The recess or pocket 969 underneath the transverse wall surface 969t will accommodate the ridge portion 169 of the substantially flat key blade when the latter is inserted into the keyway. On the right hand side of the keyway, the interconnecting part 965 extends upwardly up to the above mentioned horizontal wall surface, which forms a step-like transition 968 to the even narrower, upper part 970 of the keyway 910. As indicated above, the width of this upper relatively narrow part 970 is at most 33% of the width of the lower part 960.

In the embodiment shown in FIGS. 7a, 7b, 8a, 8b and 9, the pocket 969, forming a lateral constriction of the keyway 910 located in parallel to the upwardly extending interconnecting part 965, will thus prevent any picking tool to be moved upwards from the lower widened part 960 on the first or left hand side of the vertical plane VP where it will be caught by the pocket 969 up to the transverse, substantially horizontal surface 969t or by the downwardly directed tongue 960t, the only opening passage being the one to the right of the downwardly directed tongue 960t, along the inclined surface portions 966 and 972 in the interconnecting and upper parts 965, 970 of the keyway 910.

When following this narrow opening passage NOP (FIGS. 8a and 8b), any picking tool will meet the side portion 961s or segment of each conical end portion 961 of the central locking pin 959 which is curved in two dimensions away from the entry direction and is therefore difficult to engage or grip.

Some Preferred Embodiments of the Substantially Flat Key Blade of a Key Blank or Key According to the Invention The substantially flat key blade 150 of the key blank or key according to the invention may be formed by machining a rectangular blade 100r as shown in FIG. 11, the cross-sectional view being taken along the line 11-11 in FIG. 10, i.e. at the bitting portion between a connecting portion and a free tip portion of the substantially flat key blade to be formed.

The rectangular blade 100r has typically the dimensions 8 to 9 mm (height "h", measured along a vertical mid-plane MP) and 2.5 to 3 mm (maximum width "w", measured perpendicularly to the vertical mid-plane VP). The key may be of the kind disclosed in the above-mentioned continuation-in-part U.S. Pat. No. 10,570,643 B2 (Widen). Alternatively, the key may be of the kind disclosed in U.S. Pat. No. 10,337,210 B2 (Widen) relating to a small format interchangeable cylinder lock core ("SFIC") for a cylinder lock unit. In the latter case, the dimensions would be 8 mm (height, "h") and 2.7 mm (maximum width, "w").

In FIGS. 12-23, the two different embodiments are shown, each in a number of variants, a first embodiment according to FIGS. 12 to 17, and a second embodiment according to FIGS. 18 to 23.

In FIG. 12, the key blank 1100a has a lower part 1160a, where the lower edge surface 1161 is slightly curved, with a curvature corresponding to the curvature of the associated cylindrical key plug in which is intended to be inserted during use thereof. The height of the lower part 1160a is 15% to 50% of the total height h, measured from the lower edge surface 161 to the upper edge surface 171, whereas the height of the rest of the key blank, above the lowermost part is 50% to 85% of the total height h.

On the first side of the lower part 1160a, to the left in the drawing, there is a step-like transition with a transverse, substantially horizontal surface 1160t extending all the way to a corner 1160c, where the lower part 1160a adjoins upwardly to a slightly inclined upper part 1170a having a first inclined lateral side surface 1172a and an opposite, second lateral side surface 1173a. The lateral side surfaces 1172a, 1173a are both inclined, with an inclinational angle α of 3 to 12 degrees, preferably about 8 degrees, relative to the vertical mid-plane MP, as discussed above. In this particular variant of the first embodiment, the second lateral side surface 1173a reaches all the way from the upper edge surface 1171 down to the lower edge surface 1161, so there is no step-like transition on this second side of the key blank.

In a second variant of the first embodiment, shown in FIG. 13, the structure of the key blank 1100b is the same as in FIG. 14, except that on the second side, to the right in the drawing, there is a step-like transition 1168b where the second lateral side surface of the upper part adjoins to a transverse, substantially horizontal surface. Here, an interconnecting part 1165b is located vertically between the upper part 1170b and the lower part 1160b.

In a third variant of the substantially flat key blade 1100c, shown in FIG. 14, the structure is like the structure of FIG. 13, except that the step-like transition 1168c at the second side (to the right) is located at a higher vertical level. So, the interconnecting part 1165c has a longer vertical extension in this variant.

The variants 1100d, 1100e, 1100f of the first embodiment shown in FIGS. 15, 16, 17 correspond, in respect of the division of the key blank into two or three parts, to the structures of FIGS. 12, 13, 14, respectively, the only difference being that there are relatively small ribs R1, R2 extending longitudinally on the upper and interconnecting parts (FIGS. 15 and 16) and relatively shallow grooves G1, G2 extending longitudinally along the interconnecting part and partially along the lower part (FIGS. 16 and 17). Such ribs and grooves may be formed by methods being well-known in the art, for example, with rotating cutter tools. Also, in the variant 1100f, there is a longitudinal rib portion 1121f extending along the connecting portion (denoted 120 in FIG. 2) of the substantially flat key blade, as will be explained further below.

The second embodiment of the key blank, shown in FIGS. 18 to 23, corresponds essentially to the above described first embodiment, except that on the first (left hand) side of the lower part, there is a ridge 1169 extending upwards in parallel to the interconnecting and/or the upper part on the other side of the vertical mid-plane MP. Such a ridge has been described above, and the variant of the key blank 1200c in FIG. 20, corresponds to the embodiment of the substantially flat key blade 150 described above with reference to the FIGS. 1b, 4b and 6a.

Some Additional Embodiments within the Scope of the Present Invention

Generally, a key code pattern is formed on the key according to the present invention in an upper edge code portion of the upper part thereof, i.e. a centrally located key code pattern (such as the V-cuts 131a to 131f provided on the embodiments described above), and possibly also in a lateral side surface portion of the lower part and/or the interconnecting part of the substantially flat key blade, on one or both lateral sides of the substantially flat key blade.

In FIG. 29, there is shown how a key 1100 according to the present invention cooperates with two side locking mechanisms. The key is also provided with central V-cuts 1131 in the upper edge portion 1171 (FIG. 30), as described above.

The key 1100 cooperates, in this embodiment, with two side locking mechanisms 1200, 1300, respectively, on each side of a central keyway 1910 in the rotatable key plug 1900 of the associated lock (not shown in its entirety). Such side locking mechanisms are previously known, e.g. from the above-mentioned U.S. Pat. No. 10,337,210 B2 (Widen) and the corresponding continuation-in-part U.S. Pat. No. 10,570,643 B2 (Widen), the latter relating to a cylinder lock core for a cylinder lock unit. In the context of the present invention, however, the side code patterns on the substantially flat key blade 1150 are not necessarily confined to a longitudinal half of the substantially flat key blade located closest to the grip portion 1110 of the key, but may extend along the entire length of the substantially flat key blade or only along a part of the length. Possibly, there is only one side locking tumbler on each respective side.

In this embodiment, each side locking mechanism comprises one or more side locking tumblers 1210 and 1310, respectively, each having a transverse finger 1211, 1311 projecting sideways into a side code pattern 1151, 1152 located in each respective lateral side surface of the lower and interconnecting parts 1160, 1165 of the substantially flat key blade 1150. On the second side of the key, to the left in FIG. 29, the side code pattern 1151 is located partly in the interconnecting part 1165 of the substantially flat key blade.

Like in the embodiments described above, the upper part 1170 of the key 1100 is slightly inclined relative to the vertical mid-plane thereof (in this embodiment coinciding with the vertical central plane VP of the key plug), as described above, and the key 1100 also has, at its first side (to the right in FIG. 29), an upright ridge 1169 (most of it being hidden by the transverse finger 1311 in the drawing), in which the side code pattern 1152 is located, e.g. in the form of wave-like recess (not shown) in the material of the substantially flat key blade. The wave-like side code pattern includes coded concavities at different levels, possibly also including an extra code level at the top of the ridge portion 1169, as is previously known from the U.S. patent specification U.S. Pat. No. 7,159,424 (Widen).

In FIG. 29 it is seen that the wave-like side code pattern 1152, on the first side (to the right) of the substantially flat key blade, is provided with only one wave-like guiding surface, on which the transverse finger 1311 is supported and guided when the substantially flat key blade is inserted into the keyway 1910, whereas the wave-like side code pattern 1151, on the second side (to the left) of the substantially flat key blade has upper and lower, mutually parallel guiding surfaces which forcedly guides the finger 1211 of the side locking tumbler 1210 along the wave-like pattern 1151 which is formed as a groove on the second side (to the left) of the substantially flat key blade 1150.

The finger 1311 (to the right in FIG. 29) is held down on the associated guiding surface by means of an upper helical spring 1398, so that the side locking tumbler 1310, when the key 1100 is inserted into the keyway 1910, moves up and down in an associated chamber 1396 extending vertically on a lateral side of the central keyway 1910. On the second side (to the left in FIG. 29, see also FIG. 34) the wave-like part of the side code pattern 147, forming a groove, extends only along a part of the total length of the substantially flat key blade, and merges with a straight portion and a downwardly slanted end portion (not shown) near the tip of the substantially flat key blade. When the key 1100 is totally withdrawn from the keyway 1910 in the key plug 1900, a helical spring 1298 will hold the side locking tumbler 1210 in a lowermost position.

When the side locking tumblers 1210, 1310 are located in the positions shown in FIG. 29, defined by the vertical location of the respective concavity of the side code patterns 1151, 1152, a side bar 1220 and 1320, respectively, will have its inwardly (towards the centre of the key plug) projecting lug 1221, 1321 positioned in registry with an associated recess in an outer surface of the respective side locking tumbler 1210, 1310. In this way, when the key plug is rotated by means of the inserted key 1100, the side bars 1220 and 1320 will be permitted to move inwardly towards the centre of the key plug 1900, and thereby disengage from associated grooves (not shown) in the housing (not shown either) of the cylinder lock. Thus, the lock may now be opened by a further rotational movement of the key 1100.

In principle, the side locking mechanisms 1200 and 1300 are previously known per se in the prior art technology of cylinder locks, but not in combination with a key 1100 according to the present invention having a single, inclined, relatively narrow upper part 1170 of the substantially flat key blade 1100.

FIGS. 29 to 49 also illustrates another possible feature, involving a well-defined stop arrangement defining the full insertion of the substantially flat key blade 1150 into the keyway 1910 where the cylinder lock may be released. For this purpose, see FIGS. 30 and 32, the substantially flat key blade 1150 of the key 1100 is provided with a longitudinal rib portion 1121 having an axially well-defined end surface 1125 located at a relatively small distance from the grip portion 1110 of the key 1100. In the keyway 1910 of the key plug 1900, there is an associated axial cavity or bore 1921, see FIG. 31. The axial bore 1921 has a shape corresponding to the axial rib portion 1121 of the substantially flat key blade 1150, so as to accommodate the axial rib portion 1121, when the key 1100 is being inserted into the keyway 1910 of the key plug 1900. The axial length of the bore 1921 is selected so that, when the end surface 1125 of the rib portion 1121 abuts a bottom surface 1925 of the axial bore 1921, the key 1100 is positioned so as to define the full insertion of the substantially flat key blade into the keyway permitting the lock to be released and opened by turning of the key 1100.

Such a pair of an axial rib portion and an axial bore may be provided also on the other side of the lock and key combination, if so desired, as will be explained below.

Now, a key blank 100', from which the above described embodiments of coded keys may be formed, will be briefly described with reference to FIGS. 33 to 37, these Figures also disclosing an optional feature of a rib portion serving as a stop arrangement.

A key blank 100' according to the present invention is configured to fit into a keyway of a cylindrical key plug of an associated cylinder lock having a key plug 990' as shown schematically in FIG. 33. The key blank 100', see FIG. 34, includes a substantially flat substantially flat key blade 150', which extends from a grip portion 110' along a longitudinal axis A and includes (compare FIG. 2 where the portions of the substantially flat key blade are shown more clearly) a connecting portion 120', a bitting portion 130', and a free tip portion 140'.

The substantially flat substantially flat key blade has a cross-sectional profile, see FIG. 36, which, in the major longitudinal bitting portion 130' (compare also FIG. 1*b* and FIGS. 12 to 23), is confined within a rectangle having a height h, measured in a vertical direction, being at least 2.5 times larger than a width w thereof, and extends upwards in the vertical direction from a lower edge surface 161' to an upper edge surface 171' along a vertical mid-plane MP through the rectangle, the vertical mid-plane being located in the middle of the rectangle, includes at least two parts: a lower, relatively wide part 160', including the lower edge surface and having a maximum width, measured between a first lower side surface 161' and a second lower side surface 162', being the same as or slightly less than the width w of the rectangle, the maximum width being 75% to 100% of the width of the rectangle, an upper, relatively narrow part 170', provided with the upper edge surface 171' and being narrower than the lower part 160', and possibly an interconnecting part 165' extending between the lower and upper parts along the vertical mid-plane, wherein: the upper, relatively narrow part 170' has a lateral width being no more than 33% of the maximum width w of the lower part 160', and extends obliquely upwards along a first direction being inclined at a relatively small angle α, in the interval 3° to 12°, relative to the vertical mid-plane MP, and opposite, first and second upper side surfaces 172',173' of the upper, relatively narrow part 170' are inclined at such relatively small angles relative to the vertical mid-plane MP, that an imaginary downward extension of the upper part, substantially in a second direction opposite to the first direction, will fall onto the lower edge surface 161' of the substantially flat key blade 150', at a same second side (to the right) of the vertical mid-plane MP and inside the second lower side surface 162' of the lower part.

A number of advantageous further features of the key blank are stated above, under the heading "SUMMARY OF THE INVENTION" and are also apparent from the above detailed description of the key and the substantially flat key blade. It should also be noted that key blanks are often commercialized by key manufacturers to locksmiths who will make a finished key according to well-known methods. For example, a key blank having a side code pattern (1151 and 1152 in FIG. 29), on one or both sides of a substantially flat key blade, as described above, may be sold to locksmiths who will then cut the codes (such as 1131 in FIG. 30) at the upper edge 1171 of the substantially flat key blade for a local market. So, even the key blanks as such are commercial products.

As indicated above, the key blank 100' may be provided with a longitudinal rib portion 121' located at the upper relatively narrow part 170' of the substantially flat key blade, at the connecting portion 120' thereof, adjacent to the grip portion 110' of the key blank 100', see FIGS. 34 and 35. The longitudinal rib portion serves as a stop arrangement which will secure that the substantially flat key blade (of a finished, coded key, when being inserted into the keyway in a key plug of an associated cylinder lock), will be stopped exactly when reaching a position which will enable a releasing of the cylinder lock by turning of the key and the key plug within the housing of the cylinder lock.

The stop arrangement, with the longitudinal rib portion on the connecting portion of substantially flat key blade, will now be briefly described with reference to FIGS. 37 to 49. Here, the flexibility obtained by the special stop arrangement is illustrated by two different sub-groups in a new cylinder lock and key system, one sub-group including cylinder locks with key plugs 2900 and corresponding keys 2100, shown in FIGS. 37, 38 and 39, and another sub-group including cylinder locks with key plugs 3900 and corresponding keys 3100, shown in FIGS. 40, 41 and 42, this sub-group being also compatible with an existing similar system of cylinder locks and keys where there are no special stop arrangements other than a conventional step-like transition portion adjacent to the grip portion of the key co-operating with a corresponding contact surface portion at the front end portion of the key plug of the associated cylinder lock.

On the key 2100 of FIGS. 37, 38, 39, there is a relatively long rib portion 2121 which extends from the grip portion 2110 along the major part of the connecting portion 2120 almost all the way to the bitting portion 2130 being provided with the V-cuts in the upper edge 2171 of the substantially flat key blade. As seen in larger scale in FIG. 39, the longitudinal rib portion 2121, located at a lateral side of an upper part of the substantially flat key blade (compare FIGS. 30 and 36) extends longitudinally through the radially widened portion 2930 (being massive in this embodiment) and a bit further into the cylindrical portion 2940 having a smaller diameter. The rib portion 2121 has an end surface 2125 rather close to the first bore 2905 accommodating a central lower locking pin, this end surface forming a first abutment surface. In the position shown in FIGS. 38 and 39, the end surface of 2125 on the key contacts a corresponding second abutment surface 2925 in an entrance opening 2921 of the key plug 2900. The dimensions are selected so that, when the first and second abutment surfaces make contact with each other, during insertion of the key 2100 into the key plug, the key has reached a longitudinal relative position which will enable a release of the cylinder lock by turning the key and key plug within the housing (not shown) of the cylinder lock.

FIGS. 40 to 43 illustrate another key and key plug combination belonging to another sub-group in the system, where the key plug 3900 of the cylinder lock includes, in addition to the central locking pins (not shown), two side locking mechanisms with a short row of two locking tumblers, being movable up and down in bores 3396, and another short row of two locking tumblers, being movable up and down in bores 3296, on the other lateral side (compare FIG. 29). The side locking mechanisms also include, on each lateral side, a side bar, one of them (3220) being visible in FIG. 40. In this sub-group, the radially widened portion 3930 of the key plug 3900 is longitudinally enlarged, being thicker than the corresponding portion 2921 in the embodiment of FIG. 39, so that the second abutment surface, formed by the inner surface portion 3925 is located a short distance inside the front end surface of the key plug, see FIG. 42. The longitudinal enlargement of the radially widened portion 3930 is such that, when using the key 3100 together with a normally thick portion 4930 of a key plug 4900 belonging to an existing cylinder lock (not shown), the end surface 3125 of the rib portion 3121 will contact a planar front end surface 4925 of the key plug 4900 of the existing cylinder lock, exactly when the relative position of the new key and the key plug of the existing cylinder lock will enable a release of the latter. In this way, a backward compatibility is achieved. On the other hand, the existing keys (not shown) cannot open the new locks, because the thicker radially widened portion will stop the existing key with a normal step-like key stop before it reaches the releasing position relative to the key plug of the new lock. Accordingly, a new quite separate sub-group of locks and keys can be added to an existing cylinder lock and key system. This is a useful result of the flexibility offered by the laterally offset longitudinal rib portion located at the connecting portion of the substantially flat key blade.

As indicated above, it is possible to provide a longitudinal rib portion, serving as a stopping arrangement, on one or both sides of the substantially flat key blade, at the upper, relatively narrow part thereof. A few examples are shown in FIGS. 44 to 49.

Figure 45:
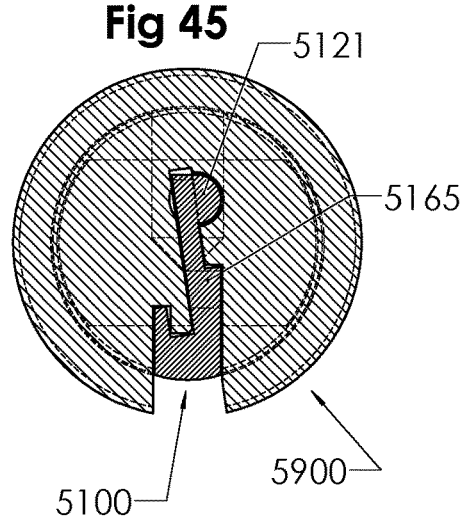

In the embodiment of FIGS. 44 and 45, there is only one longitudinal rib portion 5121, located on the same side as the interconnecting part 5165 of the substantially flat key blade. Here, the cross-sectional profile is, in principle, the same as the one shown in FIG. 23. The associated key plug 5900 has a laterally sideways extended part of the keyway configured to receive the longitudinal rib portion 5121 of the substantially flat key blade.

Figure 46:
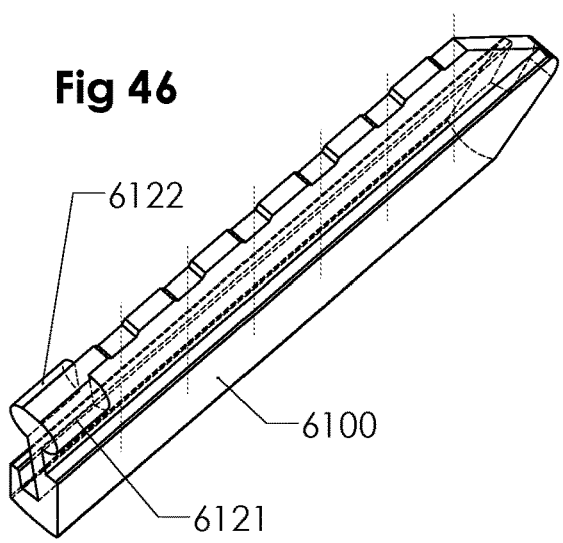
FIGS. 46 and 47 show, in similar views as in FIGS. 44 and 45, a variant with two longitudinal rib portions, one on each lateral side of the substantially flat key blade, the two rib portions having the same lengths.
Figure 47:
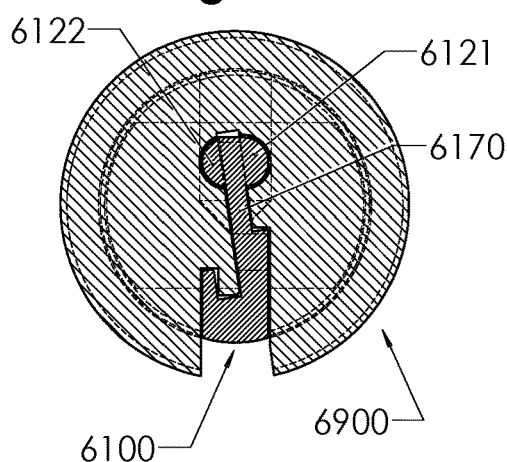

In the embodiment of FIGS. 46 and 47, there are two longitudinal rib portions 6121, 6122 of equal lengths, one on each lateral side of the upper part 6170 of the substantially flat key blade, there being formed corresponding laterally sideways extended parts of the keyway in the associated key plug 6900. The outer contours of the two longitudinal rib portions 6121, 6122 are confined within the rectangle R defining the outer contour of the profile of the substantially flat substantially flat key blade, compare FIGS. 1b and 36.

Figure 48:
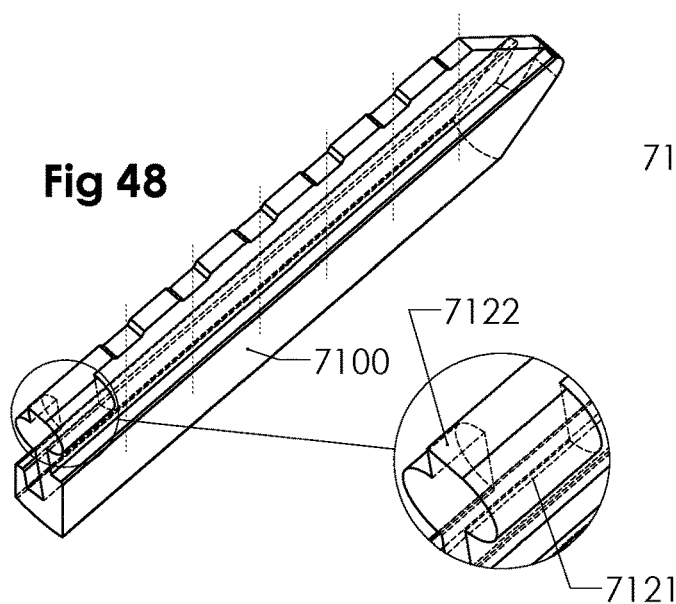
FIGS. 48 and 49 show, in similar views as in FIGS. 44 and 45, another variant with one longitudinal rib portion on each lateral side of the substantially flat key blade, one of them being shorter than the other one and also being displaced somewhat vertically downwards.
Figure 49:
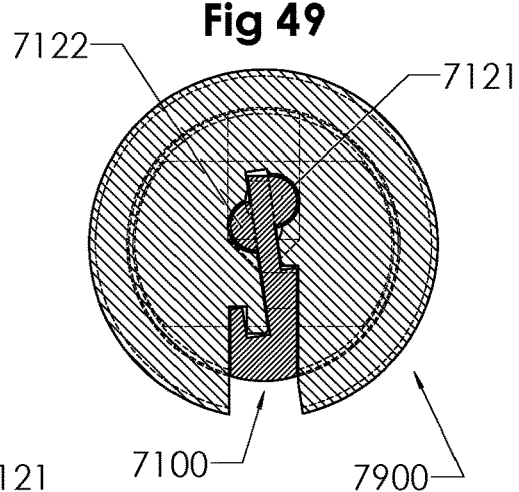

In the embodiment of FIGS. 48 and 49, there are also two longitudinal rib portions 7121, 7122, one of them being relatively long (7121), and the other being relatively short (7122). See the enlarged detail of FIG. 48. The shorter one (7122) is also displaced somewhat vertically downwards. These longitudinal rib portions 7121, 7122 are likewise confined within the rectangle R.

In addition to serving as a stopping arrangement, each longitudinal rib portion, by way of its lateral integration in one piece with the relatively narrow upper part of the substantially flat key blade in the connecting portion thereof, forms a reinforcement of the key blank and the coded key in the connecting portion thereof. Thus, the substantially flat key blade will have a greater strength, even during possible attempts to use a coded key together with a cylinder lock which does not match the key.

Possible Concealed Key Code Patterns

As indicated above, in connection with the above description of one or two side code patterns at the lower part of the substantially flat key blade 1150, with reference to FIG. 29, it was mentioned that there may be a side code pattern formed at a security ridge of the substantially flat key blade of the key blank, on the first side of the substantially flat key blade opposite to the second side where the inclined upper part of the substantially flat key blade extends upwards. As shown in FIGS. 50a, 50b, 50c and 50d, such a security ridge may be formed by cutting a key code in the lower part 8160 of the key blank 8100 by means of a rotating cutter disc 10, which is moved along a wave-like curve along the longitudinal axis of the key blank. The rotating cutter disc 10 is held in a vertical plane, oriented in parallel to the vertical mid-plane MP of the key blank 8100 and is mounted on a rotating shaft 11 being held in a horizontal direction being perpendicular to the vertical mid-plane MP of the key blank while being moved longitudinally, in the direction indicated by the arrow PD in FIG. 50b, relative to the key blank. While being moved longitudinally, the rotating shaft 11 will also be moved vertically up and down.

The relative dimensions (the thickness of the rotating cutter disc 10 and the width of the step-like transition 8160t of the lower part 8160 on the first side, to the left in FIG. 50a, of the vertical mid-plane MP) are such that when the rotating disc is moved along the key blank, a security ridge 8169 will be formed at the first side of the lower part 8160 of the key blank. At the inside of this security ridge, there will be formed a wave-like key code pattern, indicated with a dashed line 8161w in FIGS. 50b and 50d, near the lower edge surface 8161 of the key blank. This key code pattern 8161 will be concealed by the security ridge 8169 if and when the key blank is observed laterally sideways, from the left in FIGS. 50a and 50c. Thus, it will be difficult to observe or measure the key code pattern 8161w by optical methods for somebody who may wish to copy the key blank and its side code pattern 8161w inside the security ridge 8169.

If so desired, it is possible to cut a further side code pattern 8161w' at a somewhat higher vertical level at the security ridge itself, for example, by moving the rotating cutter disc 10 a second time longitudinally along the key blank 8100, but then displaced sideways, to the left in FIGS. 50a and 50c, in order to cut through all the material in an upper portion of the security ridge 8169. Such a second side code pattern is indicated in FIGS. 50b and 50d by a wave-like dash-dotted line 8161w', with concavities 8161c'. With such a double side code pattern 8161w, 8161w', the security ridge 8169 will be partially broken by the second side code pattern 8161w', and the first side code pattern 8161w will be only partially concealed by the remaining portion of the security ridge 8169 (the broken portion of the security ridge is not shown on the drawing).

In the embodiment of the key blank 8100 shown in FIGS. 51a to 51d, the inclinational angle α of the upper part 8170 of the substantially flat key blade is 5°, corresponding to the cross-sectional profile (of the corresponding keyway in the key plug) shown in FIG. 27. For such an inclinational angle, it is possible to orient the rotating disc 10 in a vertical plane, as shown in FIG. 50a, and still form a security ridge at the first side (to the left in FIG. 50a), opposite to the inclined upper part 8170 of the substantially flat key blade.

In case of a slightly larger inclinational angle α of the upper part 9170 of the key blank, such as 8°, see FIGS. 51a, 51b, 51c and 51d, it is still possible to form a security ridge by means of a rotating cutter disc 20, for example by holding the rotating cutter disc in a slightly inclined plane while being moved longitudinally (arrow PD), the inclinational angle of the shaft 21 being 8° relative to a horizontal plane. In this case, with only one side code pattern in the key blank 9100, the side code pattern 9161w, with concavities 9161c, will be totally concealed or hidden laterally sideways by the security ridge 9169. Also, the width of the lower part 9160 of the key blank can be somewhat smaller, so that the vertical planes VP and MP coincide with each other, as shown.

Those skilled in the art will understand that a coded key or a key blank, having a lower side code pattern being totally or partially hidden sideways by a security ridge will increase the security against unauthorized copying of a coded key (for example having a central upper edge code and one or two lower side codes) or a key blank (for example having only one or two lower side codes).

Of course, any lower side code, such as the ones illustrated in FIGS. 50a to 50d and in FIGS. 51a to 51d, may be formed by other methods than utilizing a rotating cutter disc, for example by additive methods in a wide range of materials, such as polymers, metals and metal alloys, including 3D printing methods.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A key blank configured to fit into a keyway of a cylindrical key plug of an associated cylinder lock, comprising a substantially flat key blade, which:
   extends from a grip portion along a longitudinal axis (A),
   includes a connecting portion, a major longitudinal bitting portion to be provided with a row of coded cuts, and a free tip portion,
   has a cross-sectional profile which, in said major longitudinal bitting portion,
      is confined within a rectangle having a height (h), measured in a vertical direction, being at least 2.5 times larger than a width (w) thereof, and
      extends upwards in said vertical direction from a lower edge surface to an upper edge surface along a vertical mid-plane (MP) through said rectangle, the vertical mid-plane being located in the middle of said rectangle,
   includes at least two parts:
      a lower, relatively wide part, including said lower edge surface and having a maximum width, measured between a first lower side surface and a second lower side surface, being the same as or slightly less than the width of the rectangle, the maximum width being 75% to 100% of the width (w) of the rectangle,
      an upper, relatively narrow part, provided with the upper edge surface and being narrower than the lower part, and
      an interconnecting part possibly extending between the lower and upper parts along said vertical mid-plane,
   wherein:
      the upper, relatively narrow part has a lateral width being no more than 33% of said maximum width of the lower part, and extends obliquely upwards along a first direction (P1) pointing away from said second lower side wall of the lower part and being inclined at a relatively small angle α, in the interval 3° to 12°, relative to said vertical mid-plane, and
      the sideways or lateral location, within said rectangle, of said upper relatively narrow part of said key blade, including first and second upper side surfaces thereof, is such that an imaginary downward extension thereof, substantially in a second direction (P2) opposite to said first direction, will fall onto said lower edge surface of the substantially flat key blade, at a same second side of said vertical mid-plane (MP) and inside said second lower side surface of the substantially flat key blade.

2. The key blank as defined in claim 1, wherein the lower relatively wide part of the substantially flat key blade:
includes, at a vertical level adjacent to said interconnecting part, a laterally offset region located substantially at a same lateral side of said mid-plane (MP) as said second lower side surface;
an interconnecting part of the substantially flat key blade:
adjoins to said laterally offset region of the lowermost part and extends vertically upwards therefrom,
with a central side surface being located in the vicinity of said vertical mid-plane (MP) and being inclined in said first direction (P1), away from said laterally offset region of the lower part,
and with an outside side surface adjoining, possibly via a transition, to said second lower side surface of the substantially flat key blade, and
the upper part of the substantially flat key blade:
forms an upward extension of said interconnecting part,
forms, at said first upper side surface, a substantially straight extension of said central side surface of the interconnecting part, and
also forms, at said opposite second upper side surface, a substantially straight surface which adjoins to said outside surface of said interconnecting part, possibly via a transition.

3. The key blank as defined in claim 1, wherein said relatively narrow upper part is substantially uniform along the vertical extension of said upper part, possibly with a tapering uppermost portion thereof.

4. The key blank as defined in claim 1, wherein at least a part of each said first and second upper side surface of said upper part of the substantially flat key blade is located on a first side and on a second side, respectively, of said vertical mid-plane (MP).

5. The key blank as defined in claim 1, wherein a total vertical height of said interconnecting part and said upper part of the substantially flat key blade is in the interval 50% to 85% of a total vertical height (h) of the substantially flat key blade.

6. The key blank as defined in claim 1, wherein a central side surface of said interconnecting part crosses said vertical mid-plane (MP).

7. The key blank as defined in claim 1, wherein the lower part of the substantially flat key blade has an upper first transverse surface located substantially on the same lateral side of the vertical mid-plane (MP) as the first lower side surface thereof, said first transverse surface forming a corner with an adjoining central side surface of an interconnecting part, the corner being located in the vicinity of the vertical mid-plane (MP), and the first transverse surface forming at least a part of a first step-like transition between the lower part and the interconnecting part of the substantially flat key blade.

8. The key blank as defined in claim 7, wherein said first transverse surface extends laterally all the way from said first lower side of the lowermost part to said corner, so as to form said first step-like transition.

9. The key blank as defined in claim 8, wherein said second upper side surface of the upper part adjoins as a substantially straight extension to the second lower side surface of the lower part, or there is also a second step-like transition on said other side of the vertical mid-plane, where said second upper side surface of the upper part adjoins to said outside surface of the interconnecting part.

10. The key blank as defined in claim 7, wherein said first step-like transition also comprises an upward ridge extending upwards in a direction substantially in parallel to said interconnecting part said upward ridge having an outside surface portion adjoining to said first lower side surface of the lower portion, a top surface portion, and an inside surface portion adjoining to said first transverse surface, said first transverse surface thus forming only a part of said first step-like transition, and there being formed an undercut groove being defined by said inside surface portion of said ridge, said first transverse surface with said corner, and said central side surface of said interconnecting part.

11. The key blank as defined in claim 1, wherein the key blank, on one or both lateral sides of the substantially flat key blade, is provided with at least one longitudinal groove (G1; G2) or at least one profile rib (R2) serving to provide:
a specific cross-sectional profile and/or
a stopping arrangement which enables releasing the associated cylinder lock with a correctly configured substantially flat key blade, so that the latter will be stopped when it has reached a certain longitudinal position upon being inserted into the key plug of an associated cylinder lock.

12. The key blank as defined in claim 11, including said stopping arrangement being provided with a first selectable abutment surface facing in a forward direction along said longitudinal axis, wherein:
said first abutment surface on the substantially flat key blade is formed as a forward end surface of a longitudinal rib portion:
being located at a lateral side of the upper, relatively narrow part of the substantially flat key blade at a vertical level lying within a vertical range of the bitting portion of the substantially flat key blade,
extending in parallel to the longitudinal axis of the substantially flat key blade,
being confined longitudinally to the connecting portion of the substantially flat key blade,
being confined also within the contour of or laterally slightly outside said rectangle, with a possible lateral extension exceeding the width of the rectangle by at most 25%, and
having a selectable length, measured from said grip portion, being any desired fraction of the length of the connecting portion,
whereby the location of said forward end surface of the rib portion is selectable along the whole length of the connecting portion.

13. The key blank as defined in claim 1, provided with at least one key code pattern in said substantially flat key blade so as to form a coded key, wherein said at least one key code pattern includes a central key code pattern with a longitudinal row of coded cuts in said upper relatively narrow inclined part of the substantially flat key blade and possibly also at least one side code pattern in said lower relatively wide part.

14. The key blank as defined in claim 13, wherein said at least one side code pattern is located inside an upright security ridge of the substantially flat key blade so as to be at least partly concealed when being observed sideways from a lateral side of the substantially flat key blade.

15. The key blank as defined in claim 14, wherein said at least one side code pattern is located at a bottom surface of an undercut groove pocket which is situated at an inside of said upright security ridge.

16. The key blank as defined in claim 15, wherein there is also a side code pattern in an upper portion of said upright security ridge of the substantially flat key blade, so that there are two neighbouring side code patterns side by side, including an inner wave-like side code pattern being partially concealed by a remaining portion of said security ridge.

17. The coded key as defined in claim 13, in combination with said associated cylinder lock, thus forming a cylinder lock and key combination, possibly forming part of a cylinder lock and key system with several coded keys and corresponding cylinder locks.

18. The cylinder lock and key combination as defined in claim 17, including a longitudinal rib portion forming a first abutment surface on the substantially flat key blade, wherein:
 the key plug of the associated cylinder lock is provided with a second abutment surface:
  either in a longitudinal cavity formed on one or both lateral sides of the keyway in said key plug, or
  by a front end surface located at a radially widened front end portion of the key plug,
 a release of the cylinder lock occurring when said first and second abutment surfaces make contact with each other.

19. The cylinder lock and key combination as defined in claim 18, wherein each said longitudinal rib portion, by way of its lateral integration in one piece with said relatively narrow upper part of the substantially flat key blade in said connecting portion, forms a reinforcement of the coded key in said connecting portion thereof.

20. Key blank configured to fit into a keyway of a cylindrical key plug of an associated cylinder lock, comprising a substantially flat key blade with an upper relatively narrow part and a lower relatively wide part, the width of the upper relatively narrow part being no more than 33% of the width of the lower relatively wide part,
 wherein:
 the substantially flat key blade is provided with:
  an upper, central bitting portion in said upper relatively narrow part, said bitting portion being dimensioned to enable the formation of a central key code pattern therein, and
  at least one wave-like inner side code pattern in said lower relatively wide part of the substantially flat key blade at a bottom surface of an undercut groove pocket, which is located at the inside of an upright security ridge so as to be at least partially concealed when being observed sideways in a lateral direction.

21. A key blank as defined in claim 20, wherein there is also a side code pattern in an upper portion of said upright security ridge of the substantially flat key blade, so that there are two neighbouring side code patterns located side by side, including said inner wave-like side code pattern being partially concealed by a remaining portion of said security ridge when being observed sideways in a lateral direction.

* * * * *